United States Patent
Wang

(10) Patent No.: US 10,028,229 B2
(45) Date of Patent: Jul. 17, 2018

(54) PREAMBLE SENDING METHOD, POWER CONTROL METHOD, TERMINAL, AND DEVICE

(71) Applicant: Huawei Technologies Co., Ltd., Shenzhen (CN)

(72) Inventor: Fan Wang, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/235,333

(22) Filed: Aug. 12, 2016

(65) Prior Publication Data

US 2016/0353389 A1 Dec. 1, 2016

Related U.S. Application Data

(63) Continuation of application No. PCT/CN2014/076645, filed on Apr. 30, 2014.

(30) Foreign Application Priority Data

Feb. 14, 2014 (WO) ................ PCT/CN2014/072098

(51) Int. Cl.
*H04W 52/14* (2009.01)
*H04W 52/22* (2009.01)
(Continued)

(52) U.S. Cl.
CPC .......... *H04W 52/146* (2013.01); *H04L 43/16* (2013.01); *H04W 52/228* (2013.01); *H04W 52/325* (2013.01); *H04W 52/44* (2013.01)

(58) Field of Classification Search
CPC ............. H04W 52/146; H04W 52/228; H04W 52/325; H04W 52/44; H04L 43/16
See application file for complete search history.

(56) References Cited

U.S. PATENT DOCUMENTS

2007/0030829 A1 2/2007 Vimpari et al.
2007/0030838 A1 2/2007 Kaikkonen et al.
(Continued)

FOREIGN PATENT DOCUMENTS

CN      101026396 A    8/2007
CN      101179825 A    5/2008
(Continued)

OTHER PUBLICATIONS

Ericsson, "On Improving the Power Control after Long DTX on Secondary Carriers", Feb. 10-14, 2014, 3GPP TSG-RAN WG1 Meeting #76, R1-140810, pp. 1-4.*

(Continued)

*Primary Examiner* — Paul H Masur
(74) *Attorney, Agent, or Firm* — Leydig, Voit & Mayer, Ltd.

(57) ABSTRACT

Disclosed is a preamble sending method, including: acquiring a first uplink transmission gap, where the first uplink transmission gap is a time interval between initiation, by a terminal, of current uplink transmission and termination of the most recent uplink transmission; and when the first uplink transmission gap is greater than or equal to at least one time threshold in a first preset time threshold, sending a Preamble that includes a DPCCH (dedicated physical control channel) to a network side. By using the method, a network-side device located at a base station can control uplink transmission power of the terminal according to a sent DPCCH pulse.

9 Claims, 15 Drawing Sheets

(51) Int. Cl.
*H04W 52/32* (2009.01)
*H04W 52/44* (2009.01)
*H04L 12/26* (2006.01)

(56) References Cited

U.S. PATENT DOCUMENTS

| | | |
|---|---|---|
| 2007/0183788 A1 | 8/2007 | Kim et al. |
| 2007/0189237 A1 | 8/2007 | Jaatinen et al. |
| 2008/0043681 A1* | 2/2008 | Vimpari ............ H04B 7/2656 370/335 |
| 2008/0280638 A1 | 11/2008 | Malladi et al. |
| 2010/0157953 A1 | 6/2010 | Christoffersson et al. |
| 2012/0058797 A1 | 3/2012 | Gaal et al. |
| 2012/0071186 A1* | 3/2012 | He ..................... H04W 52/325 455/509 |

FOREIGN PATENT DOCUMENTS

| | | |
|---|---|---|
| CN | 101238647 A | 8/2008 |
| CN | 101253700 A | 8/2008 |
| CN | 101385250 A | 3/2009 |
| CN | 101617482 A | 12/2009 |
| CN | 103607764 A | 2/2014 |
| RU | 2407169 C1 | 12/2010 |

OTHER PUBLICATIONS

Baker et al., "Power Control in UMTS Release '99," 3G Mobile Communication Technologies, pp. 36-40, XP-000900538, IEEE, Institute of Electrical and Electronics Engineers, New York, New York, (1999).
"3$^{rd}$ Generation Partnership Project; Technical Specification Group Radio Access Network; Physical layer procedures (FDD) (Release 11)," 3GPP TS 25.214, V11.7.0, pp. 1-128, 3$^{rd}$ Generation Partnership Project, Valbonne, France (Sep. 2013).
"Further Details on Dedicated Secondary Carrier," 3GPP TSG-RAN WG1 Meeting #73, Fukuoka, Japan, R1-132610, 3$^{rd}$ Generation Partnership Project, Valbonne, France (May 20-24, 2013).
"TP on Lean Carrier," 3GPP TSG RAN WG1 Meeting #74, Barcelona, Spain, R1-133928, 3$^{rd}$ Generation Partnership Project, Valbonne, France (Aug. 19-23, 2013).
"Power Control Issues for Gated DPCCH," 3GPP TSG RAN WG1, Tokyo, Japan, TSGR1#12(00)0691, 3$^{rd}$ Generation Partnership Project, Valbonne, France (May 22-25, 2000).

* cited by examiner

PREAMBLE SENDING METHOD, POWER CONTROL METHOD, TERMINAL, AND DEVICE

CROSS-REFERENCE TO RELATED APPLICATIONS

This application is a continuation of International Application No. PCT/CN2014/076645, filed on Apr. 30, 2014, which claims priority to International Application No. PCT/CN2014/072098, filed on Feb. 14, 2014, all of which are hereby incorporated by reference in their entireties.

TECHNICAL FIELD

The present disclosure relates to the field of mobile communications, and in particular, to a Preamble sending method, a power control method, a terminal, and a network-side device.

BACKGROUND

The Universal Mobile Telecommunications System (UMTS) is a mainstream 3G wireless communications standard formulated by the Third Generation Partnership Project (3GPP). In order to meet an ever-increasing rate requirement of users, a High Speed Packet Access (HSPA) technology, including High Speed Downlink Packet Access (HSDPA) introduced in Release 5 and High Speed Uplink Packet Access (HSUPA) introduced in Release 6, is introduced to the UMTS to improve spectral efficiency, and mainly provides a higher data rate, a lower delay, and a higher system capacity.

In 3GPP Release 7, a Continuous Packet Connectivity (CPC) feature supporting discontinuous transmission/discontinuous reception is introduced. This feature allows discontinuous reception and transmission for a UE (user equipment). When there is no data being transmitted, an uplink discontinuous transmission function allows termination of DPCCH (dedicated physical control channel) transmission in the uplink, so as to reduce uplink interference. In order to maintain power control and link synchronization, the UE periodically sends DPCCH control information within a discontinuous transmission period. With further in-depth study on the 3GPP standards, a Further Enhanced Uplink Enhancement (Further EUL Enhancement) feature is being studied in 3GPP Release 12, where there is a technology called a lean carrier and is also called a dedicated secondary carrier; and the core idea of this technology lies in that, when a UE does not send data, a DPCCH is no longer periodically sent either.

Through repeated research and practice, it is discovers that, in the dedicated secondary carrier scheme, a UE sends a DPCCH only when transmitting data in the uplink; therefore, when the UE initiates uplink transmission, a base station cannot control uplink transmission power because there is no data scheduling for the UE for a relatively long time before.

SUMMARY

In view of this, a purpose of embodiments of the present disclosure is to provide a preamble sending method, so as to solve a problem that a base station cannot control uplink transmission power when the base station does not receive a DPCCH for a long time.

According to a first aspect of the embodiments of the present disclosure, a preamble sending method is provided, including:

acquiring a first uplink transmission gap, where the first uplink transmission gap is a time interval between initiation, by a terminal, of current uplink transmission and termination of most recent uplink transmission; and when the first uplink transmission gap is greater than or equal to at least one time threshold in a first preset time threshold, sending a preamble that includes dedicated physical control channel DPCCH control information to a network-side device.

With reference to the first aspect, in a first possible implementation manner, the method further includes:

when the first uplink transmission gap is less than a smallest time threshold in the first preset time threshold, skipping sending a Preamble that includes DPCCH control information to the network-side device.

With reference to the first aspect, in a second possible implementation manner, the first preset threshold includes a first time threshold and a second time threshold, and the sending a Preamble that includes DPCCH control information to a network-side device includes:

when the first uplink transmission gap is between the first time threshold and the second time threshold, obtaining first sending duration of the Preamble; and sending, in the first sending duration, the Preamble that includes the DPCCH control information to the network-side device.

With reference to the second possible implementation manner of the first aspect, in a third possible implementation manner, the first preset threshold further includes a third time threshold, and the first, the second, and the third time thresholds are in ascending order; and the sending a Preamble that includes DPCCH control information to a network-side device includes:

when the first uplink transmission gap is between the second time threshold and the third threshold, obtaining second sending duration of the Preamble; and sending, in the second sending duration, the Preamble that includes the DPCCH control information to the network-side device, where the second sending duration is greater than the first sending duration; or when the first uplink transmission gap is greater than the third threshold, obtaining third sending duration of the Preamble; and sending, in the third sending duration, the Preamble that includes the DPCCH control information to the network-side device, where the third sending duration is greater than the second sending duration.

With reference to the first aspect, or the first possible implementation manner of the first aspect, or the second possible implementation manner of the first aspect, or the third possible implementation manner of the first aspect, in a fourth possible implementation manner, the method further includes:

receiving uplink grant signaling sent by the network-side device, where the uplink grant signaling is used to indicate a time when the terminal initiates uplink transmission; and the acquiring a first uplink transmission gap includes:

acquiring the first uplink transmission gap according to the uplink grant signaling.

According to a second aspect of the embodiments of the present disclosure, a terminal is provided, including:

a first acquiring unit, configured to acquire a first uplink transmission gap, where the first uplink transmission gap is a time interval between initiation, by a terminal, of current uplink transmission and termination of most recent uplink transmission; and a first sending unit, connected to the first acquiring unit and configured to, when the first uplink transmission gap is greater than or equal to at least one time threshold in a first preset time threshold, send a preamble that includes dedicated physical channel DPCCH control information to a network-side device.

With reference to the second aspect, in a first possible implementation manner, the first preset threshold includes a first time threshold and a second time threshold, and the first sending unit includes:

a first sending subunit, configured to: when the first uplink transmission gap is between the first time threshold and the second threshold, obtain first sending duration of the Preamble; and send, in the first sending duration, the Preamble that includes the DPCCH control information to the network-side device.

With reference to the first possible implementation manner of the second aspect, in a second possible implementation manner, the first preset threshold further includes a third time threshold, and the first, the second, and the third time thresholds are in ascending order; and the first sending unit further includes:

a second sending subunit, configured to: when the first uplink transmission gap is between the second time threshold and the third time threshold, obtain second sending duration of the Preamble; and send, in the second sending duration, the Preamble that includes the DPCCH control information to the network-side device, where the second sending duration is greater than the first sending duration; and a third sending subunit, configured to: when the first uplink transmission gap is greater than the third time threshold, obtain third sending duration of the Preamble; and send, in the third sending duration, the Preamble that includes the DPCCH control information to the network-side device, where the third sending duration is greater than the second sending duration.

With reference to the second aspect, or the first possible implementation manner of the second aspect, or the second possible implementation manner of the second aspect, in a third possible implementation manner, the terminal further includes:

a first receiving unit, connected to the first acquiring unit and configured to receive uplink grant signaling sent by the network-side device, where the uplink grant signaling is used to indicate a time when the terminal initiates uplink transmission.

According to a third aspect of the embodiments of the present disclosure, a power control method is provided, including:

sending uplink grant signaling to a terminal, where the uplink grant signaling is used to indicate a time when the terminal initiates uplink transmission; and when a preamble that includes dedicated physical control channel DPCCH control information and is sent by the terminal is received, controlling uplink transmission power of the terminal according to the DPCCH control information in the Preamble.

With reference to the third aspect, in a first possible implementation manner, the method further includes:

when a Preamble that includes DPCCH control information and is sent by the terminal is not received, controlling current uplink transmission power of the terminal according to DPCCH control information in a most recently received Preamble sent by the terminal.

According to a fourth aspect of the embodiments of the present disclosure, a network-side device is provided, including:

a second sending unit, configured to send uplink grant signaling to a terminal, where the uplink grant signaling is used to indicate a time when the terminal initiates uplink transmission; and a control unit, connected to the second sending unit and configured to, when a preamble that includes dedicated physical control channel DPCCH control information and is sent by the terminal is received, control uplink transmission power of the terminal according to the DPCCH control information in the Preamble.

With reference to the fourth aspect, in a first possible implementation manner, the control unit is further configured to, when a Preamble that includes DPCCH control information and is sent by the terminal is not received, control current uplink transmission power of the terminal according to DPCCH control information in a most recently received Preamble sent by the terminal.

According to a fifth aspect of the embodiments of the present disclosure, a preamble sending method is provided, including:

sending physical layer signaling to a terminal, where the physical layer signaling instructs the terminal to determine, according to the physical layer signaling when receiving the physical layer signaling, whether to send a preamble that includes dedicated physical control channel DPCCH control information; and when the terminal sends a Preamble of dedicated physical control channel DPCCH control information, receiving the preamble that is of the dedicated physical control channel DPCCH control information and is sent by the terminal.

With reference to the fifth aspect, in a first possible implementation manner, before the sending physical layer signaling, the method further includes:

acquiring a second uplink transmission gap, where the second uplink transmission gap is a time interval between initiation, by the terminal, of current uplink transmission and termination of most recent uplink transmission; and when the second uplink transmission gap is greater than or equal to at least one time threshold in a second preset time threshold, the physical layer signaling further includes Preamble duration information, where the Preamble duration information is Preamble sending duration.

With reference to the first possible implementation manner of the fifth aspect, in a second possible implementation manner, the method further includes:

when the second uplink transmission gap is less than at least one time threshold in a second preset time threshold, there is no information in the physical layer signaling, so as to instruct the terminal not to send a Preamble that includes a DPCCH.

With reference to the fifth aspect, or the first possible implementation manner of the fifth aspect, or the second possible implementation manner of the fifth aspect, in a third possible implementation manner, the physical layer signaling and code of an enhanced dedicated channel E-DCH absolute grant channel E-AGCH are sent by using a same physical channel.

With reference to the fifth aspect, or the first possible implementation manner of the fifth aspect, or the second possible implementation manner of the fifth aspect, in a fourth possible implementation manner, information, which indicates whether to send a Preamble, in the physical layer signaling is carried by using two bits.

According to a sixth aspect of the embodiments of the present disclosure, a network-side device is provided, including:

a third sending unit, configured to send physical layer signaling to a terminal, where the physical layer signaling instructs the terminal to determine, according to the physical layer signaling when receiving the physical layer signaling, whether to send a preamble that includes dedicated physical control channel DPCCH control information; and a second receiving unit, connected to the third sending unit and configured to, when the terminal sends a Preamble of dedicated physical control channel DPCCH control information, receive the preamble that is of the dedicated physical control channel DPCCH control information and is sent by the terminal.

With reference to the sixth aspect, in a first possible implementation manner, the network-side device further includes:

a second acquiring unit, configured to acquire a second uplink transmission gap, where the second uplink transmission gap is a time interval between initiation, by the terminal, of current uplink transmission and termination of most recent uplink transmission.

According to a seventh aspect of the embodiments of the present disclosure, a preamble sending method is provided, including:

receiving physical layer signaling sent by a network-side device, where the physical layer signaling is used to indicate whether a terminal sends a preamble that includes dedicated physical control channel DPCCH control information; and determining, according to the physical layer signaling, whether to send a preamble that includes dedicated physical control channel DPCCH control information.

With reference to the seventh aspect, in a first possible implementation manner, the determining, according to the physical layer signaling, whether to send a Preamble that includes a DPCCH includes:

when there is no information in the physical layer signaling, skipping sending a Preamble that includes a DPCCH.

With reference to the seventh aspect, in a second possible implementation manner, the determining, according to the physical layer signaling, whether to send a Preamble that includes a DPCCH includes:

when the physical layer signaling further includes Preamble duration information, sending a Preamble that includes a DPCCH, where the Preamble duration information is Preamble sending duration.

According to an eighth aspect of the embodiments of the present disclosure, a terminal is provided, including:

a third receiving unit, configured to receive physical layer signaling sent by a network-side device, where the physical layer signaling is used to indicate whether a terminal sends a preamble (Preamble) that includes dedicated physical control channel DPCCH control information; and a determining unit, connected to the third receiving unit and configured to determine, according to the physical layer signaling, whether to send a preamble that includes dedicated physical control channel DPCCH control information.

According to a ninth aspect of the embodiments of the present disclosure, a preamble sending method is provided, including:

receiving uplink grant signaling sent by a network-side device; and when a hybrid automatic repeat request HARQ process corresponding to the uplink grant signaling at the time when the uplink grant signaling becomes effective is in an inactive state, sending a preamble that includes dedicated physical control channel DPCCH control information.

With reference to the ninth aspect, in a first possible implementation manner, the sending a Preamble that includes a DPCCH includes:

acquiring a third uplink transmission gap, where the third uplink transmission gap is a time interval between initiation, by a terminal, of current uplink transmission and termination of most recent uplink transmission; and comparing the third uplink transmission gap with a time threshold in a third preset threshold, where the third preset threshold includes a fourth time threshold and a fifth time threshold; when the third uplink transmission gap is between the fourth time threshold and the fifth time threshold, obtaining fourth sending duration of the Preamble; and sending, in the fourth sending duration, the Preamble that includes the DPCCH control information With reference to the first possible implementation manner of the ninth aspect, in a second possible implementation manner, the third preset threshold further includes a sixth time threshold, and the fourth, the fifth, and the sixth time thresholds are in ascending order; and further, when the third uplink transmission gap is between the fifth time threshold and the sixth threshold, fifth sending duration of the Preamble is obtained, where the fifth sending duration is greater than the fourth sending duration; and the Preamble that includes the DPCCH control information is sent in the fifth sending duration;

or, when the third uplink transmission gap is greater than the sixth threshold, sixth sending duration of the Preamble is obtained, where the sixth sending duration is greater than the fifth sending duration; and the Preamble that includes the DPCCH control information is sent in the sixth sending duration.

According to a tenth aspect of the embodiments of the present disclosure, a terminal is provided, including:

a fourth receiving unit, configured to receive uplink grant signaling sent by a network-side device; and a fourth sending unit, connected to the fourth receiving unit and configured to, when a hybrid automatic repeat request HARQ process corresponding to the uplink grant signaling at the time when the uplink grant signaling becomes effective is in an inactive state, send a preamble that includes dedicated physical control channel DPCCH control information.

With reference to the tenth aspect, in a first possible implementation manner, the fourth sending unit includes:

an acquiring subunit, configured to acquire a third uplink transmission gap, where the third uplink transmission gap is a time interval between initiation, by a terminal, of current uplink transmission and termination of most recent uplink transmission; and a comparing subunit, configured to compare the third uplink transmission gap with a time threshold in a third preset threshold.

According to an eleventh aspect of the embodiments of the present disclosure, a preamble sending method is provided, including:

sending uplink grant signaling to a terminal, where the uplink grant signaling instructs the terminal to send, when a hybrid automatic repeat request HARQ process corresponding to the uplink grant signaling at the time when the uplink grant signaling becomes effective is in an inactive state, a preamble that includes dedicated physical control channel DPCCH control information; and receiving the Preamble that includes the DPCCH control information and is sent by the terminal.

According to a twelfth aspect of the embodiments of the present disclosure, a network-side device is provided, including:

a fifth sending unit, configured to send uplink grant signaling to a terminal, where the uplink grant signaling instructs the terminal to send, when a hybrid automatic repeat request HARQ process corresponding to the uplink grant signaling at the time when the uplink grant signaling becomes effective is in an inactive state, a preamble that includes dedicated physical control channel DPCCH control information; and a fifth receiving unit, connected to the fifth sending unit and configured to receive the Preamble that includes the DPCCH control information and is sent by the terminal.

According to a thirteenth aspect of the embodiments of the present disclosure, a method for sending dedicated physical control channel DPCCH control information is provided, including:

acquiring a fourth uplink transmission gap, where the fourth uplink transmission gap is a time interval between initiation, by a terminal, of current uplink transmission and termination of most recent uplink transmission, or a time interval between reception, by a terminal, of current uplink scheduling and reception of most recent uplink scheduling; and when the fourth uplink transmission gap is less than or equal to a seventh threshold, sending DPCCH control information to a network-side device by using transmit power of most recent DPCCH control information.

With reference to the thirteenth aspect, in a first possible implementation manner, the seventh threshold is predefined by the terminal or delivered by a network side to the terminal.

According to a fourteenth aspect of the embodiments of the present disclosure, a terminal is provided, including:

a third acquiring unit, configured to acquire a fourth uplink transmission gap, where the fourth uplink transmission gap is a time interval between initiation, by a terminal, of current uplink transmission and termination of most recent uplink transmission, or a time interval between reception, by a terminal, of current uplink scheduling and reception of most recent uplink scheduling; and a sixth sending unit, connected to the third acquiring unit and configured to, when the fourth uplink transmission gap is less than or equal to a seventh threshold, send DPCCH control information to a network-side device by using transmit power of most recent DPCCH control information.

According to a fifteenth aspect of the embodiments of the present disclosure, a method for sending dedicated physical control channel DPCCH control information is provided, including:

receiving physical layer signaling sent by a network side, and determining transmit power of DPCCH control information according to the physical layer signaling; where the determining method includes at least one manner of the following manners:

when the physical layer signaling instructs to use transmit power of most recent DPCCH control information, sending, by the terminal, the DPCCH control information by using the transmit power of the most recent DPCCH control information; and when the physical layer signaling instructs not to use the transmit power of the most recent DPCCH control information, determining new DPCCH transmit power in a manner different from using power of the most recent DPCCH, and sending the DPCCH control information by using the new DPCCH transmit power.

With reference to the fifteenth aspect, in a first possible implementation manner, the physical layer signaling is an HS-SCCH order, or an encoding manner of the physical layer signaling is the same as that of an enhanced dedicated channel E-DCH absolute grant channel E-AGCH.

According to a sixteenth aspect of the embodiments of the present disclosure, a terminal is provided, including:

a sixth receiving unit, configured to receive physical layer signaling sent by a network side, and determine transmit power of DPCCH control information according to the physical layer signaling;

a seventh sending unit, connected to the sixth receiving unit and configured to, when the physical layer signaling instructs to use transmit power of most recent DPCCH control information, send, by a terminal, the DPCCH control information by using the transmit power of the most recent DPCCH control information; and an eighth sending unit, connected to the sixth receiving unit and configured to, when the physical layer signaling instructs not to use the transmit power of the most recent DPCCH control information, determine new DPCCH transmit power in a manner different from using power of the most recent DPCCH, and send the DPCCH control information by using the new DPCCH transmit power.

It can be learned from the foregoing technical solutions provided in the embodiments of the present disclosure that, in a preamble sending method provided in the embodiments of the present disclosure provide, when a terminal initiates uplink transmission, the terminal acquires a time interval between initiation, by the terminal, of current uplink transmission and termination of most recent uplink transmission; and when the time interval is greater than or equal to at least one time threshold in a preset time threshold, the terminal sends a Preamble that includes a DPCCH to a network side, so that a network-side device located at a base station can control uplink transmission power of the terminal according to the DPCCH sent by the terminal.

BRIEF DESCRIPTION OF DRAWINGS

To describe the technical solutions in the embodiments of the present disclosure more clearly, the following briefly introduces the accompanying drawings required for describing the embodiments. Apparently, the accompanying drawings in the following description show merely some embodiments recorded in the present application, and persons of ordinary skill in the art may still derive other drawings from these accompanying drawings without creative efforts.

DESCRIPTION OF EMBODIMENTS

To make the solutions of this application more comprehensible for persons in the art, the following clearly describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by persons of ordinary skill in the art based on the embodiments of the present application without creative efforts shall fall within the protection scope of the present application.

Figure 1:
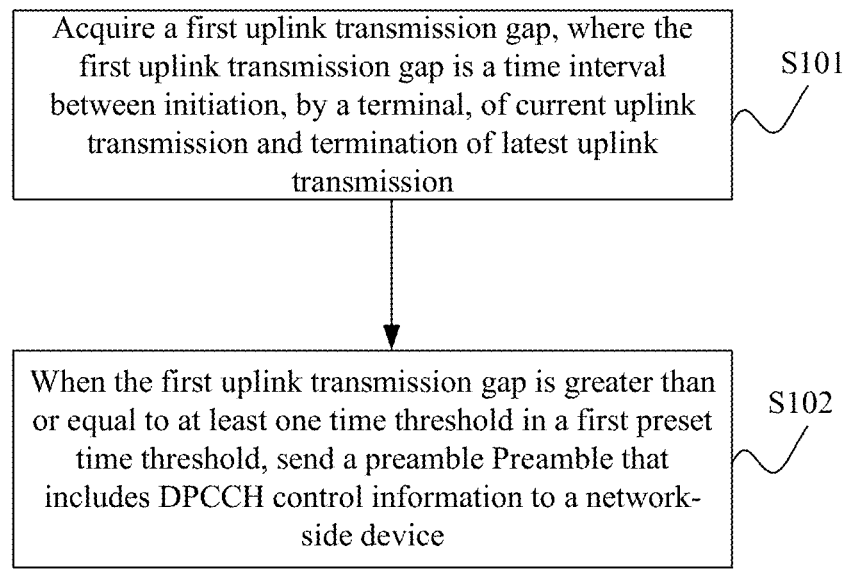
FIG. 1 is a flowchart of a preamble sending method according to an embodiment of the present disclosure.

An embodiment of the present disclosure provides a preamble sending method. The method provided in this embodiment of the present disclosure applies to a terminal, and an execution body of the method may be a terminal device such as a mobile phone or a tablet computer. Referring to FIG. 1, FIG. 1 shows a flowchart of the preamble sending method, where the method includes:

Step S101: Acquire a first uplink transmission gap, where the first uplink transmission gap is a time interval between initiation, by a terminal, of current uplink transmission and termination of most recent uplink transmission.

When receiving uplink grant signaling sent by a network-side device, the terminal acquires the first uplink transmission gap according to the received uplink grant signaling, where the first uplink transmission gap is a time interval between initiation, by the terminal, of current uplink transmission and termination of most recent uplink transmission. In this embodiment of the present disclosure, the network-side device may be a base station, and the network-side device sends the uplink grant signaling to the terminal, where the uplink grant signaling is used to indicate a time when the terminal initiates uplink transmission.

Step S102: When the first uplink transmission gap is greater than or equal to at least one time threshold in a first preset time threshold, send a preamble that includes dedicated physical control channel DPCCH control information to a network-side device.

The acquired first uplink transmission gap is compared with each time threshold in the first preset time threshold; and when the first uplink transmission gap is greater than or equal to at least one time threshold in the first preset time threshold, the terminal sends the Preamble to the network-side device, where the Preamble includes a DPCCH.

In this embodiment of the present disclosure, in a case in which a terminal does not perform uplink transmission or does not send a DPCCH to a network-side device for a long time, when the network-side device delivers uplink grant signaling to the terminal to instruct the terminal to perform uplink transmission, by using the preamble sending method provided in the present disclosure, a first uplink transmission gap is acquired when the uplink grant signaling delivered to the terminal by the network-side device is received, where the first uplink transmission gap is a time interval between initiation, by the terminal, of current uplink transmission and termination, by the terminal, of most recent uplink transmission. When the first uplink transmission gap is greater than or equal to at least one time threshold in a first preset time threshold, the terminal first sends a Preamble to the network-side device, where the Preamble includes a DPCCH, so that the network-side device can control uplink transmission power of the terminal according to the received DPCCH. In this embodiment of the present disclosure, when the Preamble includes only the DPCCH, it can be construed as that a Preamble message is a DPCCH, that is, the terminal directly sends the DPCCH to a base station.

Figure 2:
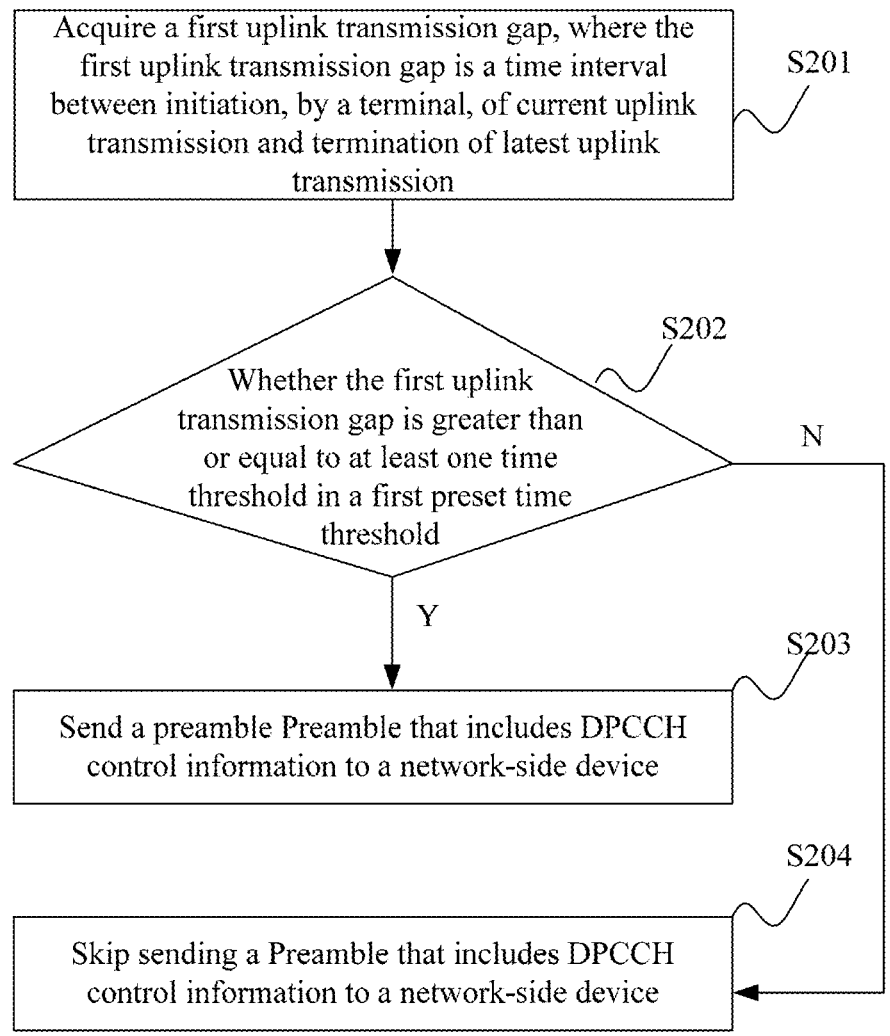
FIG. 2 is a detailed flowchart of a Preamble sending method according to an embodiment of the present disclosure.

Referring to FIG. 2, FIG. 2 shows a detailed flowchart of a preamble sending method according to an embodiment of the present disclosure, where the method includes:

step S201 to step S204, where step S201 is the same as step S101 in FIG. 1, and is not described herein again.

Step S202: Determine whether the first uplink transmission gap is greater than or equal to at least one time threshold in a first preset time threshold. When the first uplink transmission gap is greater than or equal to at least one time threshold in the first preset time threshold, execute step S203; otherwise, execute step S204.

Step S203: Send a preamble that includes DPCCH control information to a network-side device.

Step S204: Skip sending a Preamble that includes DPCCH control information to a network-side device.

It can be learned from the foregoing steps that, in this embodiment of the present disclosure, when the first uplink transmission gap is less than a smallest time threshold in the first preset time threshold, the terminal does not send a Preamble that includes DPCCH control information to the network-side device.

Figure 3:
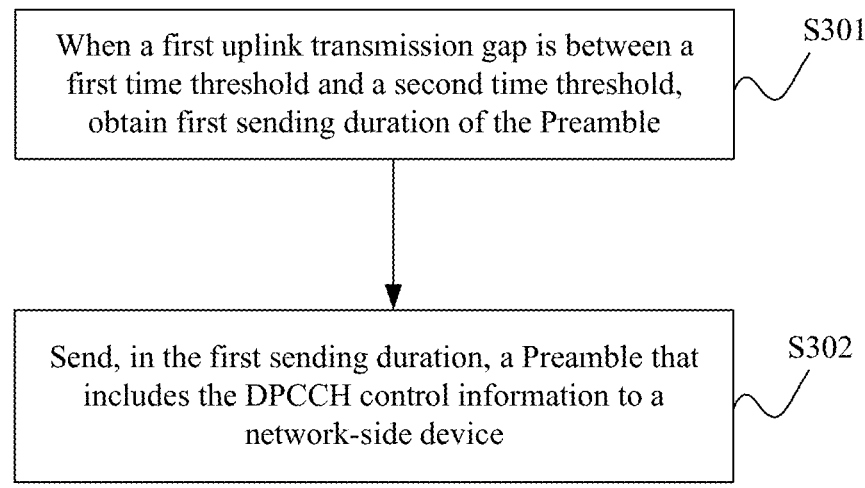
FIG. 3 is another detailed flowchart of a Preamble sending method according to an embodiment of the present disclosure.

In the preamble sending method provided in this embodiment of the present disclosure, the first preset threshold includes a first time threshold and a second time threshold. Referring to FIG. 3, the sending a Preamble that includes DPCCH control information includes:

Step S301: When the first uplink transmission gap is between the first time threshold and the second time threshold, obtain first sending duration of the Preamble.

Step S302: Send, in the first sending duration, the Preamble that includes the DPCCH control information to the network-side device.

In the preamble sending method provided in this embodiment of the present disclosure, further, the first preset threshold further includes a third time threshold, where the first time threshold, the second time threshold, and the third time threshold are in ascending order.

FIG. 3 shows a process of sending a Preamble, which includes DPCCH control information, when the first uplink transmission gap is between the first time threshold and the second time threshold.

In this embodiment of the present disclosure, when the first uplink transmission gap is between the second time threshold and the third time threshold, the process of sending a Preamble that includes DPCCH control information is similar to the process shown in FIG. 3:

When the first uplink transmission gap is between the second time threshold and the third threshold, second sending duration of the Preamble is obtained; and the Preamble that includes the DPCCH control information is sent to the network-side device in the second sending duration, where the second sending duration is greater than the first sending duration.

Similarly, when the first uplink transmission gap is greater than the third threshold, third sending duration of the Preamble is obtained; and the Preamble that includes the DPCCH control information is sent to the network-side device in the third sending duration, where the third sending duration is greater than the second sending duration.

In this embodiment of the present disclosure, the first preset time threshold includes at least one time threshold, which may be predefined by a network or the terminal, or may be configured by a network side. The first preset time threshold may be determined according to a power change of an uplink transmission physical channel of the terminal or according to a margin of a power control algorithm on the network side. If a change of the uplink transmission physical channel of the terminal is relatively slow, or if a UE is in a low-speed moving state, a time threshold in the first preset time threshold may be correspondingly set to be larger; and if the change of the uplink transmission physical channel of the terminal is relatively fast, or if the UE is in a high-speed moving state, the time threshold in the first preset time threshold may be correspondingly set to be smaller. If the margin of the power control algorithm on the network side is relatively large, for example, a relatively large margin is set for initial DPCCH power of the UE, the time threshold in the first preset time threshold may be correspondingly set to be larger; and if the margin of the power control algorithm on the network side is relatively small, for example, a relatively small margin is set for the initial DPCCH power of the UE, the time threshold in the first preset time threshold may be correspondingly set to be smaller.

In this embodiment of the present disclosure, preferably, a detailed instance is provided. A first preset time threshold is set to include a first time threshold T0, a second time threshold T1, and a third time threshold T2, where T0=20 TTI or 40 ms, T1=40 TTI or 80 ms, and T2=160 TTI or 320 ms. TTI is an transmission time interval, which indicates one subframe in UMTS and is typically 2 ms.

When uplink grant signaling is received, a first uplink transmission gap T is acquired; a sending length of one or more Preambles is defined according to the first uplink transmission gap T; and when the first uplink transmission gap meets T(M−1)<=T<T(M), a Preamble with a sending length of L(M) is sent. When T0<=T<T1, a DPCCH with one TTI is sent before data transmission; when T1<=T<T2, a DPCCH with four TTI is sent before data transmission; when T>T2, a DPCCH with 15 TTI is sent before data transmission; and a terminal initiates an uplink physical random access channel PRACH before data transmission.

It can be known from the foregoing instance that, in this embodiment of the present disclosure, a specific time point of sending a Preamble or duration of sending a Preamble is determined according to a specific length of T. Before transmitting data to a base station, the terminal first transmits a Preamble message that includes a DPCCH pulse.

In this embodiment of the present disclosure, when T<T0, no Preamble is sent.

Figure 4:
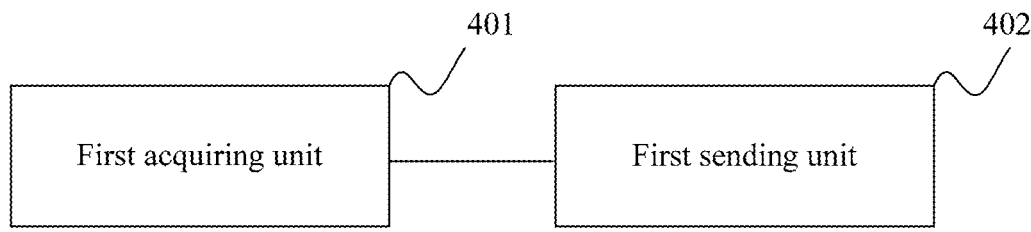
FIG. 4 is a schematic structural diagram of a terminal according to an embodiment of the present disclosure.

Corresponding to the preamble sending method shown in FIG. 1, an embodiment of the present disclosure provides a terminal, where the terminal may be a terminal device such as a mobile phone or a tablet computer. A schematic structural diagram of the terminal is shown in FIG. 4, and the terminal includes:

a first acquiring unit 401, configured to acquire a first uplink transmission gap, where the first uplink transmission gap is a time interval between initiation, by the terminal, of current uplink transmission and termination of most recent uplink transmission; and a first sending unit 402, connected to the first acquiring unit 401 and configured to, when the first uplink transmission gap is greater than or equal to at least one time threshold in a first preset time threshold, send a preamble that includes dedicated physical channel DPCCH control information to a network-side device.

In this embodiment of the present disclosure, in a case in which a terminal does not perform uplink transmission or does not send a DPCCH to a network-side device for a long time, when the network-side device delivers uplink grant signaling to the terminal, so as to instruct the terminal to perform uplink transmission, when the terminal provided in the present disclosure receives the uplink grant signaling delivered by the network-side device, a first acquiring unit 401 acquires a first uplink transmission gap, where the first uplink transmission gap is a time interval between initiation, by the terminal, of current uplink transmission and termination, by the terminal, of most recent uplink transmission. When the first uplink transmission gap is greater than or equal to at least one time threshold in a first preset time threshold, a first sending unit 402 sends a Preamble message to the network-side device, where the Preamble message includes a DPCCH, so that the network-side device can control uplink transmission power of the terminal according to the received DPCCH. In this embodiment of the present disclosure, when the Preamble message includes only the DPCCH, it can be construed as that the Preamble message is a DPCCH, that is, the terminal directly sends the DPCCH to a base station. In this embodiment of the present disclosure, the network-side device may be a base station.

In this embodiment of the present disclosure, the first preset threshold includes a first time threshold and a second time threshold, and further includes a third time threshold, where the first, the second, and the third time thresholds are in ascending order.

Figure 5:
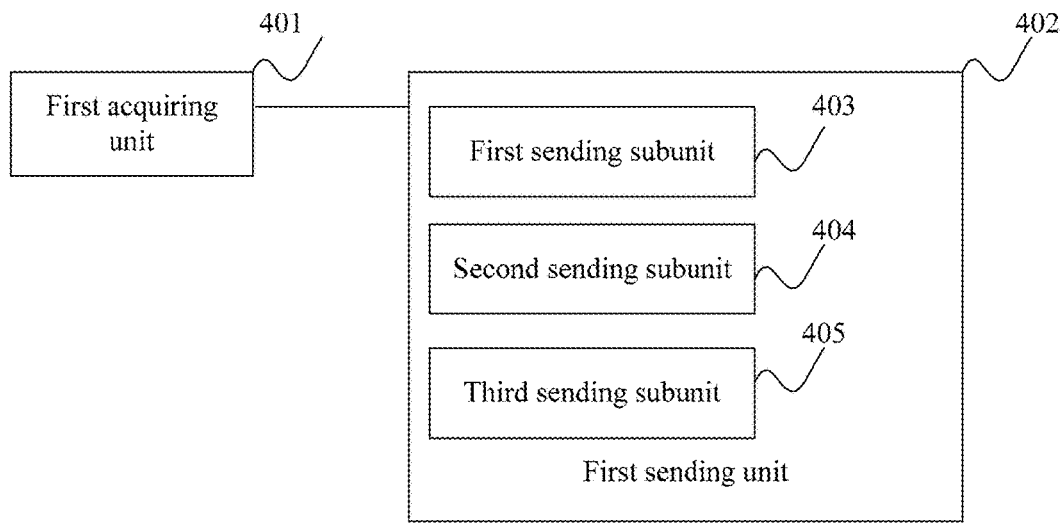
FIG. 5 is a detailed schematic structural diagram of a terminal according to an embodiment of the present disclosure.

In the terminal provided in this embodiment of the present disclosure, as shown in FIG. 5, the first sending unit 402 includes a first sending subunit 403, a second sending subunit 404, and a third sending subunit 405, where the first sending subunit 403 is configured to: when the first uplink transmission gap is between the first time threshold and the second threshold, obtain first sending duration of the Preamble; and send, in the first sending duration, the Preamble that includes the DPCCH control information to the network-side device;

the second sending subunit 404 is configured to: when the first uplink transmission gap is between the second time threshold and the third time threshold, obtain second sending duration of the Preamble; and send, in the second sending duration, the Preamble that includes the DPCCH control information to the network-side device, where the second sending duration is greater than the first sending duration; and the third sending subunit 405 is configured to: when the first uplink transmission gap is greater than the third time threshold, obtain third sending duration of the Preamble; and send, in the third sending duration, the Preamble that includes the DPCCH control information to the network-side device, where the third sending duration is greater than the second sending duration.

Figure 6:
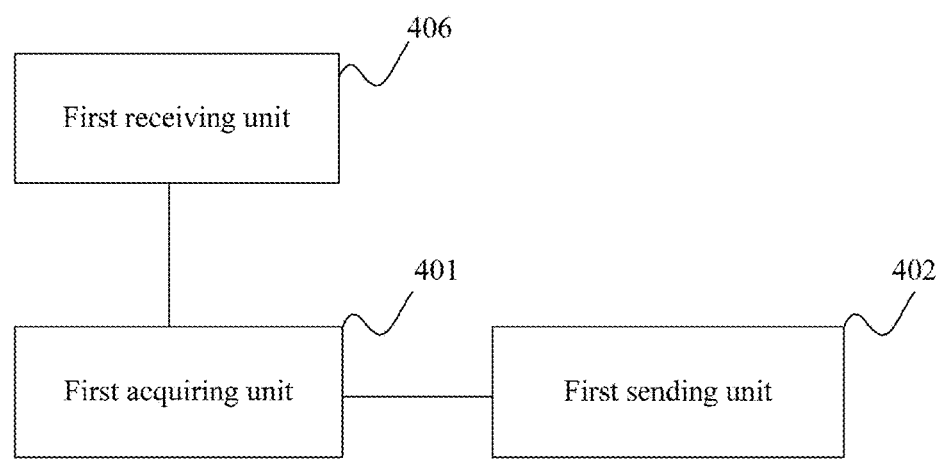
FIG. 6 is another detailed schematic structural diagram of a terminal according to an embodiment of the present disclosure.

As shown in FIG. 6, the terminal provided in this embodiment of the present disclosure further includes:

a first receiving unit 406, connected to the first acquiring unit 401 and configured to receive uplink grant signaling sent by the network-side device, where the uplink grant signaling is used to indicate a time when the terminal initiates uplink transmission.

Figure 7:
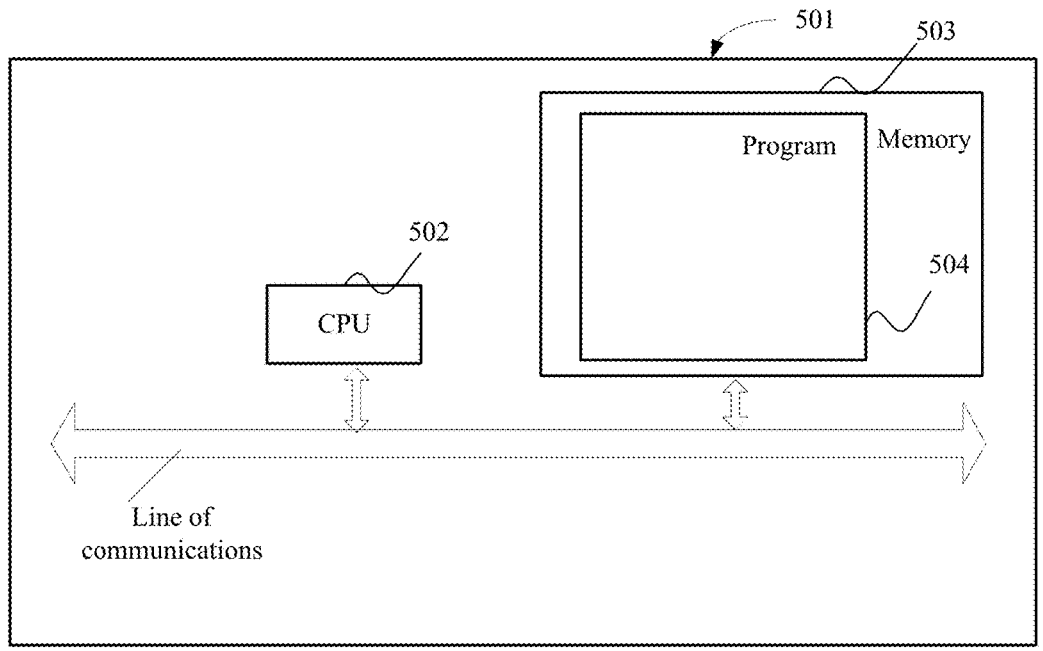
FIG. 7 is a schematic diagram of a hardware structure according to an embodiment of the present disclosure.

In this embodiment of the present disclosure, another schematic structural diagram of the terminal shown in FIG. 4 is further provided. For the schematic structural diagram of the terminal, reference may be made to a schematic diagram of a hardware structure shown in FIG. 7. The terminal 501 includes a CPU (central processing unit) 502 and a memory 503 in hardware, where the CPU 502 can execute at least the following steps by running a software program 504 stored in the memory 503 or invoking data stored in the memory 503:

acquire a first uplink transmission gap, where the first uplink transmission gap is a time interval between initiation, by the terminal, of current uplink transmission and termination of most recent uplink transmission; and when the first uplink transmission gap is greater than or equal to at least one time threshold in a first preset time threshold, send a preamble that includes dedicated physical control channel DPCCH control information to the network-side device.

For specific details of the foregoing steps, reference may be made to the foregoing records in the specification, and details are not described herein again.

The CPU 502 and the memory 503 may be integrated in a same chip, or may be two independent components.

The program 504 in this embodiment of the present disclosure may specifically include:

a first acquiring unit and a first sending unit. For detailed structures and functions of the first acquiring unit and the first sending unit, reference may be made to the foregoing records in the specification, and details are not described herein again.

Figure 8:
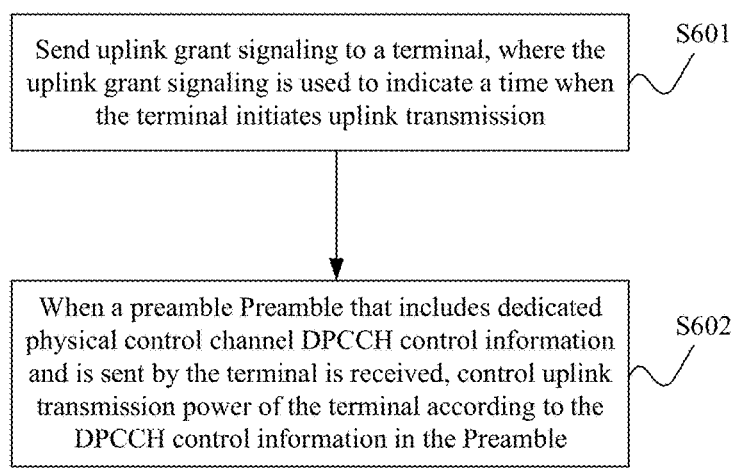
FIG. 8 is a flowchart of a power control method according to an embodiment of the present disclosure.

An embodiment of the present disclosure provides a power control method, where the method applies to a network-side device, where the network-side device may be a base station. FIG. 8 shows a flowchart of the power control method, where the method includes:

Step S601: Send uplink grant signaling to a terminal, where the uplink grant signaling is used to indicate a time when the terminal initiates uplink transmission.

When instructing the terminal to perform uplink data transmission, the network-side device sends the uplink grant signaling to the terminal, where the uplink grant signaling is used to indicate a time when the terminal initiates uplink transmission.

Step S602: When a preamble that includes dedicated physical control channel DPCCH control information and is sent by the terminal is received, control uplink transmission power of the terminal according to the DPCCH control information in the Preamble.

When receiving the Preamble that includes the DPCCH control information and is sent by the terminal, the network-side device controls the uplink transmission power of the terminal according to the DPCCH control information in the Preamble.

Figure 9:
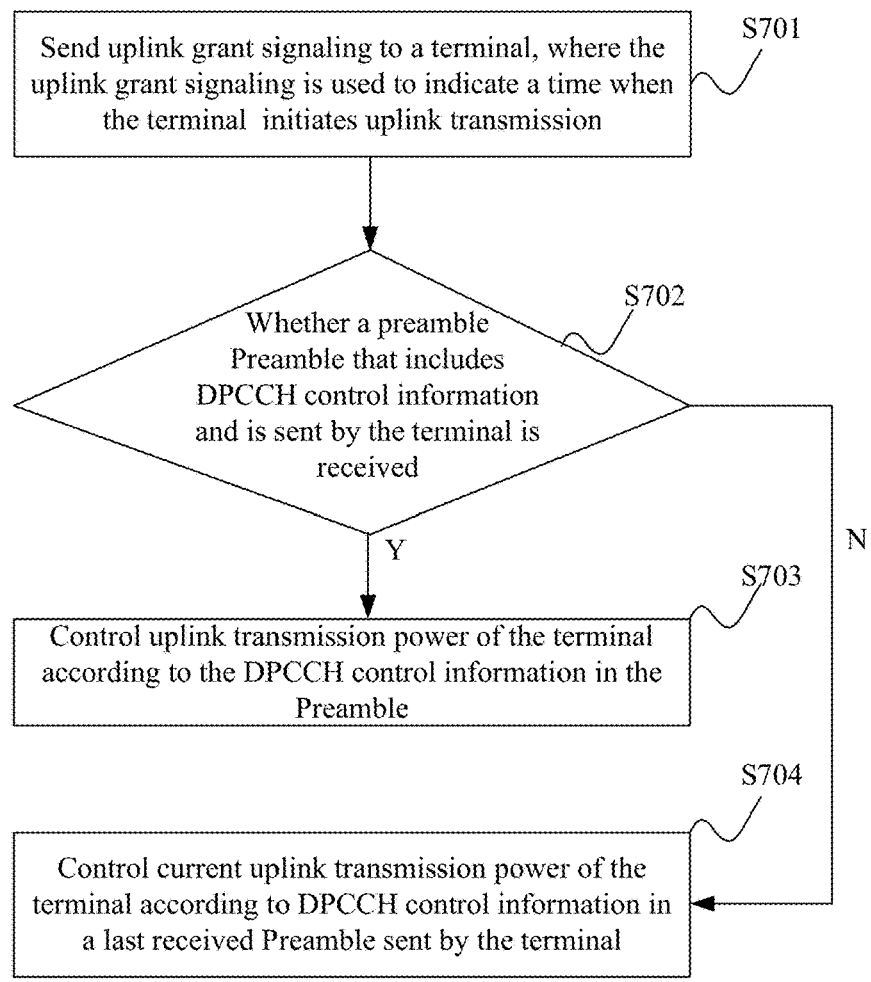
FIG. 9 is a detailed flowchart of a power control method according to an embodiment of the present disclosure.

Referring to FIG. 9, FIG. 9 shows a detailed flowchart of a power control method in an embodiment of the present disclosure, and the method includes:

Step S701: Send uplink grant signaling to a terminal, where the uplink grant signaling is used to indicate a time when the terminal initiates uplink transmission.

Step S702: Determine whether a preamble that includes DPCCH control information and is sent by the terminal is received. If yes, execute step S703; otherwise, execute step S704.

Step S703: Control uplink transmission power of the terminal according to the DPCCH control information in the Preamble.

Step S704: Control current uplink transmission power of the terminal according to DPCCH control information in a last received Preamble sent by the terminal.

In the power control method provided in this embodiment of the present disclosure, when a Preamble that includes DPCCH control information and is sent by the terminal is not received, a network-side device controls the current uplink transmission power of the terminal according to the DPCCH control information in the last received Preamble sent by the terminal.

In this embodiment of the present disclosure, when a network-side device sends uplink grant signaling to instruct a terminal to initiate uplink transmission, a terminal side determines, according to the preamble sending method shown in FIG. 1, whether the terminal sends a Preamble that includes a DPCCH to the network-side device. When the terminal side does not send a Preamble that includes a DPCCH, the network-side device may perform uplink synchronization, path search, and power control according to a DPCCH in last received Preamble sent by the terminal or according to a DPCCH reception condition on another carrier under a condition in which multiple carriers are supported in the uplink. If an uplink transmission gap exceeds a preset time threshold, the network-side device performs uplink synchronization, path search, and power control according to a Preamble sent by the terminal. The network-side device may be a base station.

Corresponding to the power control method shown in FIG. 8, an embodiment of the present disclosure provides a network-side device, where the network-side device may be a base station. For a schematic structural diagram of the network-side device, refer to FIG. 10. The network-side device includes:

a second sending unit 801, configured to send uplink grant signaling to a terminal, where the uplink grant signaling is used to indicate a time when the terminal initiates uplink transmission; and a control unit 802, connected to the second sending unit 801 and configured to, when a preamble that includes dedicated physical control channel DPCCH control information and is sent by the terminal is received, control uplink transmission power of the terminal according to the DPCCH control information in the Preamble.

In the network-side device provided in this embodiment of the present disclosure, the control unit 802 is further configured to, when a Preamble that includes DPCCH control information and is sent by the terminal is not received, control current uplink transmission power of the terminal according to DPCCH control information in a last received Preamble sent by the terminal.

In this embodiment of the present disclosure, the control unit 802 may independently execute control on uplink transmission power of the terminal, or may execute power control using blocks. For example, the control unit 802 may include a first control subunit and a second control subunit, where the first control subunit is configured to, when a preamble that includes dedicated physical control channel DPCCH control information and is sent by the terminal is received, control uplink transmission power of the terminal according to the DPCCH control information in the Preamble; and the second control subunit is configured to, when a Preamble that includes DPCCH control information and is sent by the terminal is not received, control current uplink transmission power of the terminal according to DPCCH control information in a last received Preamble sent by the terminal.

Figure 10:
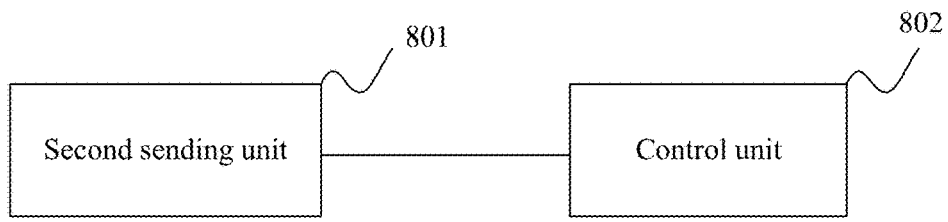
FIG. 10 is a schematic structural diagram of a network-side device according to an embodiment of the present disclosure.

In this embodiment of the present disclosure, another schematic structural diagram of the network-side device shown in FIG. 10 is further provided. For the schematic structural diagram of the network-side device, reference may also be made to the schematic diagram of the hardware structure shown in FIG. 7. The network-side device is the same as the hardware structure shown in FIG. 7 in structural composition of hardware, but different in a function executed by each piece of hardware.

The network-side device may also include a CPU and a memory in hardware, where the CPU may execute at least the following steps by running a software program stored in the memory or invoking data stored in the memory:

send uplink grant signaling to a terminal, where the uplink grant signaling is used to indicate a time when the terminal initiates uplink transmission; and when a preamble that includes dedicated physical control channel DPCCH control information and is sent by the terminal is received, control uplink transmission power of the terminal according to the DPCCH control information in the Preamble.

For specific details of the foregoing steps, reference may be made to the foregoing records in the specification, and details are not described herein again.

The CPU and the memory may be integrated in a same chip, or may be two independent components.

The program in this embodiment of the present disclosure may specifically include:

a second sending unit and a control unit. For detailed structures and functions of the second sending unit and the control unit, reference may be made to the foregoing records in the specification, and details are not described herein again.

Figure 11:
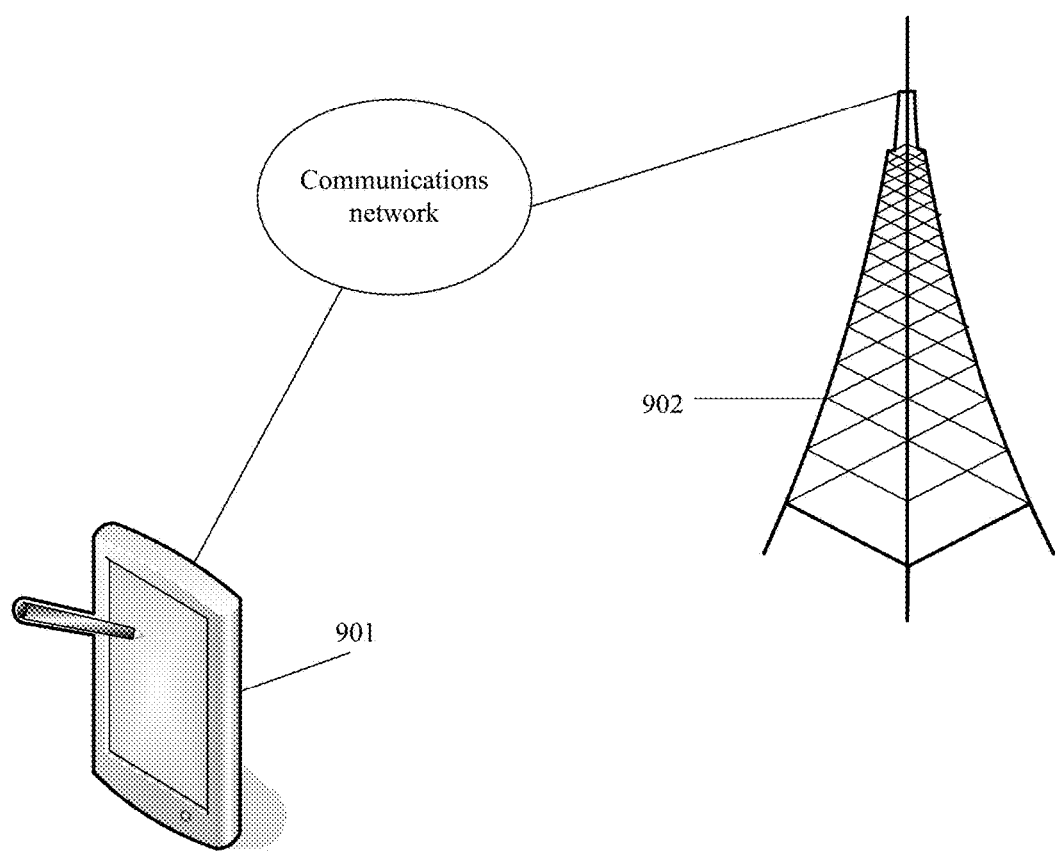
FIG. 11 is a schematic structural diagram of a communications system according to an embodiment of the present disclosure.

In an embodiment of the present disclosure, as shown in FIG. 11, the terminal shown in FIG. 4 and the network-side device shown in FIG. 10 are combined, where the terminal may be a terminal device such as a mobile phone or a computer, and the network-side device may be a base station.

As shown in FIG. 11, when a base station 902 needs to instruct a terminal 901 to initiate uplink transmission, the base station 902 sends uplink grant signaling to the terminal 901, where the uplink grant signaling is used to indicate a time when the terminal initiates uplink transmission. When receiving the uplink grant signaling, the terminal 901 acquires a first uplink transmission gap, where the first uplink transmission gap is a time interval between initiation, by the terminal, of current uplink transmission and termination of most recent uplink transmission.

When the first uplink transmission gap is greater than or equal to at least one time threshold in a first preset time threshold, a preamble that includes dedicated physical control channel DPCCH control information is sent to the network-side device. Otherwise, the terminal does not send a Preamble that includes DPCCH control information to the network-side device.

When receiving a preamble that includes dedicated physical control channel DPCCH control information and is sent by the terminal 901, the base station 902 controls uplink transmission power of the terminal according to the DPCCH control information in the Preamble. When a Preamble that includes DPCCH control information and is sent by the terminal is not received, the base station 902 controls current uplink transmission power of the terminal according to DPCCH control information in a last received Preamble sent by the terminal.

Figure 12:
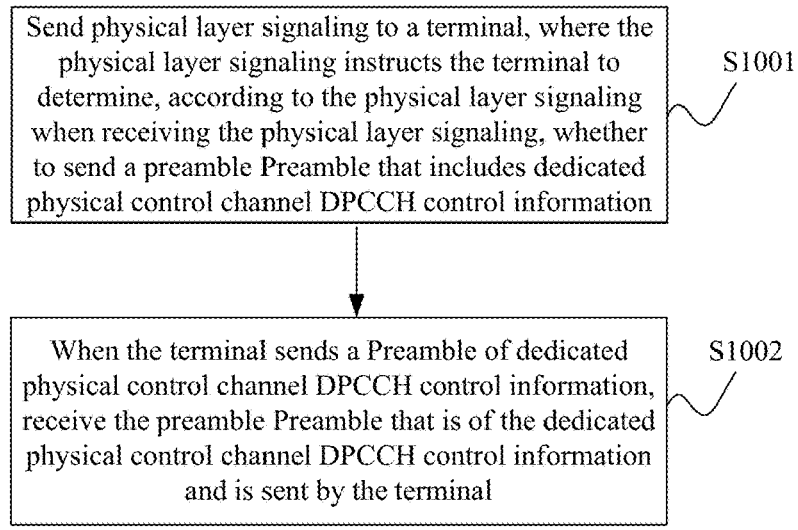
FIG. 12 is a flowchart of a preamble sending method according to an embodiment of the present disclosure.

Referring to FIG. 12, FIG. 12 shows a flowchart of a preamble sending method, where the method applies to a network device side, and the network device may be a base station. The method includes:

Step S1001: Send physical layer signaling to a terminal, where the physical layer signaling instructs the terminal to determine, according to the physical layer signaling when receiving the physical layer signaling, whether to send a preamble that includes dedicated physical control channel DPCCH control information.

Step S1002: When the terminal sends a Preamble of dedicated physical control channel DPCCH control information, receive the preamble that is of the dedicated physical control channel DPCCH control information and is sent by the terminal.

In the preamble sending method provided in this embodiment of the present disclosure, before sending the physical layer signaling, the network-side device first acquires a second uplink transmission gap, where the second uplink transmission gap is a time interval between initiation, by the terminal, of current uplink transmission and termination of most recent uplink transmission.

When the second uplink transmission gap is greater than or equal to at least one time threshold in a second preset time threshold, the physical layer signaling sent to the terminal includes Preamble duration information, so as to instruct the terminal to send a Preamble that includes a DPCCH, where the Preamble duration information is Preamble sending duration.

When the second uplink transmission gap is less than at least one time threshold in a second preset time threshold, there is no information in the physical layer signaling sent to the terminal, so as to instruct the terminal to not to send a Preamble that includes a DPCCH.

In the preamble sending method provided in this embodiment of the present disclosure, preferably, the physical layer signaling and code of an enhanced dedicated channel E-DCH absolute grant channel E-AGCH are sent by using a same physical channel.

In the preamble sending method provided in this embodiment of the present disclosure, preferably, information, which indicates whether to send a Preamble, in the physical layer signaling is carried by using two bits.

In this embodiment of the present disclosure, the physical layer signaling may be sent before uplink grant signaling, or may be sent along with the uplink grant signaling. When the physical layer signaling sent by the network-side device is sent along with the uplink grant signaling, the physical layer signaling and the uplink grant signaling may be jointly encoded, and a single physical channel or a single piece of physical signaling may also be used to instruct the terminal, for example, an HS-SCCH (Shared Control Channel for HS-DSCH), order is used for instruction.

In the preamble sending method provided in this embodiment of the present disclosure, an HS-SCCH order may also be used to indicate whether a Preamble is sent, or a Preamble sending time point or length.

In this embodiment of the present disclosure, Preamble sending duration may be determined in the following manner: in a specific implementation manner, the network-side device may predefine multiple time thresholds in a manner of setting multiple time thresholds as shown in FIG. 1, where the multiple preset time thresholds are set according to a network transmission protocol, and values of the preset time thresholds are different. When the acquired second uplink transmission gap is greater than or equal to at least one time threshold in the multiple preset time thresholds, the network-side device sends physical layer signaling to instruct the terminal to send a Preamble.

In this embodiment of the present disclosure, a sending length of one or more Preambles may be defined according to the second uplink transmission gap. In this embodiment of the present disclosure, when the second uplink transmission gap meets $T(M-1)<=T<T(M)$, a Preamble with a sending length of $L(M)$ is sent. For example, time thresholds are preset: Ta=20 TTI, Tb=40 TTI, and Tc=160 TTI. When $Ta<=Tm<Tb$, the terminal is instructed to send a DPCCH with one TTI before data transmission; when $Tb<=Tm<Tc$, the terminal is instructed to send a DPCCH with four TTI before data transmission; when $Tm>Tc$, the terminal is instructed to send a DPCCH with 15 TTI before data transmission; and the terminal initiates an uplink PRACH (physical random access channel) before data transmission.

In the Preamble sending method provided in this embodiment of the present disclosure, the physical layer signaling and the uplink grant signaling may be jointly encoded, for example, original six bits of an E-AGCH (E-DCH absolute grant channel) are reserved, and two bits are added on a basis of the channel to indicate whether the terminal sends a Preamble or indicate information about a Preamble sending time point or length.

In the Preamble sending method provided in this embodiment of the present disclosure, information about whether to send a Preamble or information about a Preamble sending time point or length may be carried by using a single physical channel, for example, by using one HS-SCCH order to indicate whether to send a Preamble, or by using one single physical channel including two bits to indicate whether to send a Preamble or information about a Preamble sending time point or length, where a Preamble length is one TTI, or a Preamble length is four TTI, or a Preamble length is 15 TTI.

In the Preamble sending method provided in this embodiment of the present disclosure, a UE terminal determines, according to the physical layer signaling sent by the network-side device, whether to send a Preamble, or a Preamble sending time point or length.

In an embodiment of the present disclosure, corresponding to the preamble sending method shown in FIG. 12, a network-side device is further provided. The schematic structural diagram of the network-side device is shown in FIG. 13, and the network-side device includes:

a third sending unit 1101, configured to send physical layer signaling to a terminal, where the physical layer signaling instructs the terminal to determine, according to the physical layer signaling when receiving the physical layer signaling, whether to send a preamble that includes dedicated physical control channel DPCCH control information; and a second receiving unit 1102, connected to the third sending unit 1101 and configured to, when the terminal sends a Preamble of dedicated physical control channel DPCCH control information, receive the preamble that is of the dedicated physical control channel DPCCH control information and is sent by the terminal.

Figure 13:
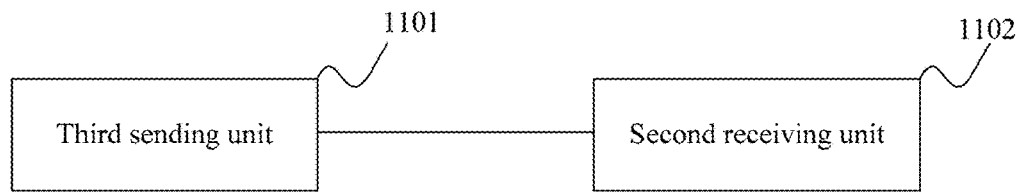
FIG. 13 is a schematic structural diagram of a network-side device according to an embodiment of the present disclosure.
Figure 14:
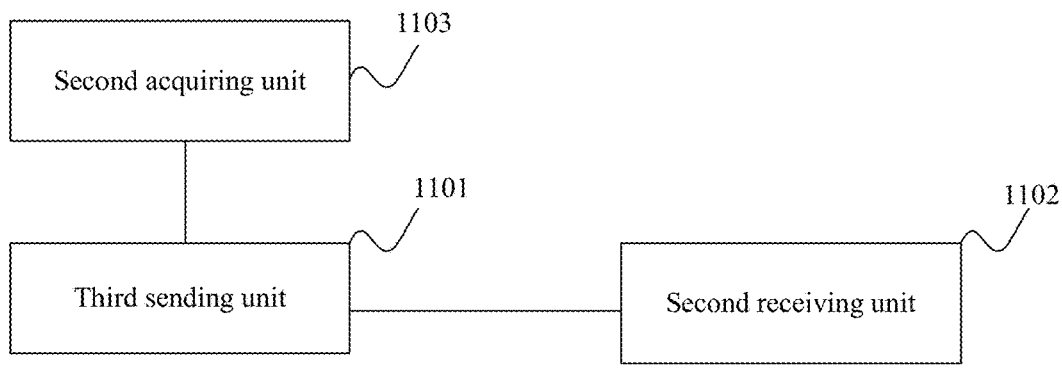
FIG. 14 is a detailed schematic structural diagram of a network-side device according to an embodiment of the present disclosure.

On a basis of FIG. 13, FIG. 14 further shows a detailed schematic structural diagram of the network-side device, where the network-side device further includes:

a second acquiring unit 1103, configured to acquire a second uplink transmission gap, where the second uplink transmission gap is a time interval between initiation, by the terminal, of current uplink transmission and termination of most recent uplink transmission.

In the network-side device provided in this embodiment of the present disclosure, before the third sending unit 1101 sends the physical layer signaling to the terminal, the second acquiring unit 1103 first acquires the second uplink transmission gap, where the second uplink transmission gap is a time interval between initiation, by the terminal, of current uplink transmission and termination of most recent uplink transmission.

When the second uplink transmission gap is greater than or equal to at least one time threshold in a second preset time threshold, the physical layer signaling further includes Preamble duration information, where the Preamble duration information is Preamble sending duration.

Further, when the second uplink transmission gap is less than at least one time threshold in a second preset time threshold, there is no information in the physical layer signaling, so as to instruct the terminal to not to send a Preamble that includes a DPCCH.

In the network-side device provided in this embodiment of the present disclosure, the physical layer signaling and code of an enhanced dedicated channel E-DCH absolute grant channel E-AGCH are sent by using a same physical channel. Information, which indicates whether to send a Preamble, in the physical layer signaling is carried by using two bits.

In this embodiment of the present disclosure, another schematic structural diagram of the network-side device shown in FIG. 13 is further provided. For the schematic structural diagram of the network-side device, reference may also be made to the schematic diagram of the hardware structure shown in FIG. 7. The network-side device is the same as the hardware structure shown in FIG. 7 in structural composition of hardware, but different in a function executed by each piece of hardware.

The network-side device may also include a CPU and a memory in hardware, where the CPU may execute at least the following steps by running a software program stored in the memory or invoking data stored in the memory:

send physical layer signaling to a terminal, where the physical layer signaling instructs the terminal to determine, according to the physical layer signaling when receiving the physical layer signaling, whether to send a preamble that includes dedicated physical control channel DPCCH control information; and when the terminal sends a Preamble of dedicated physical control channel DPCCH control information, receive the preamble that is of the dedicated physical control channel DPCCH control information and is sent by the terminal.

For specific details of the foregoing steps, reference may be made to the foregoing records in the specification, and details are not described herein again.

The CPU and the memory may be integrated in a same chip, or may be two independent components.

The program in this embodiment of the present disclosure may specifically include:

a third sending unit and a second receiving unit. For detailed structures and functions of the third sending unit and the second receiving unit, reference may be made to the foregoing records in the specification, and details are not described herein again.

Figure 15:
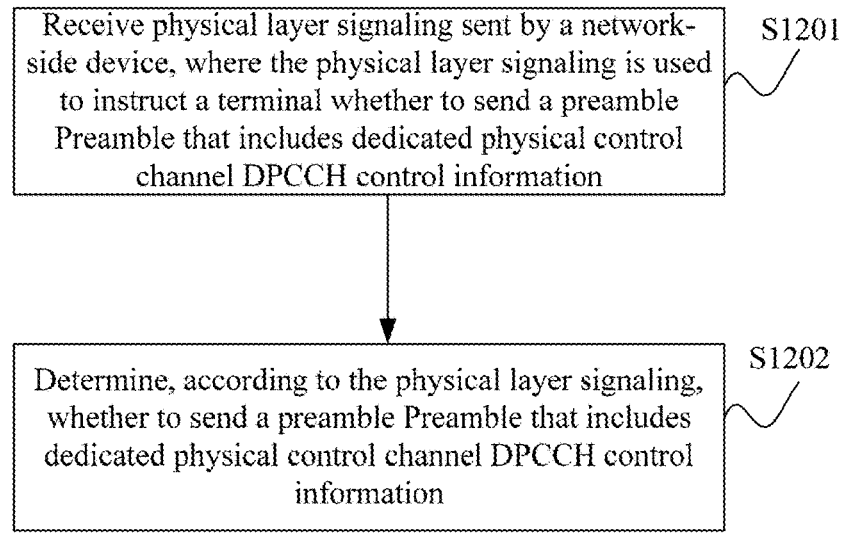
FIG. 15 is a flowchart of a preamble sending method according to an embodiment of the present disclosure.

Referring to FIG. 15, an embodiment of the present disclosure provides a preamble sending method, where the method applies to a terminal, and an execution body of the method may be a terminal device such as a mobile phone or a tablet computer. The method includes:

Step S1201: Receive physical layer signaling sent by a network-side device, where the physical layer signaling is used to indicate whether the terminal sends a preamble that includes dedicated physical control channel DPCCH control information.

Step S1202: Determine, according to the physical layer signaling, whether to send a preamble that includes dedicated physical control channel DPCCH control information.

The terminal receives the physical layer signaling sent by the network-side device. When there is no information in the physical layer signaling, the terminal does not send a Preamble that includes a DPCCH to the network-side device; and when the physical layer signaling includes Preamble duration information, the terminal sends a Preamble that includes a DPCCH to the network-side device, where the Preamble duration information is Preamble sending duration.

Figure 16:
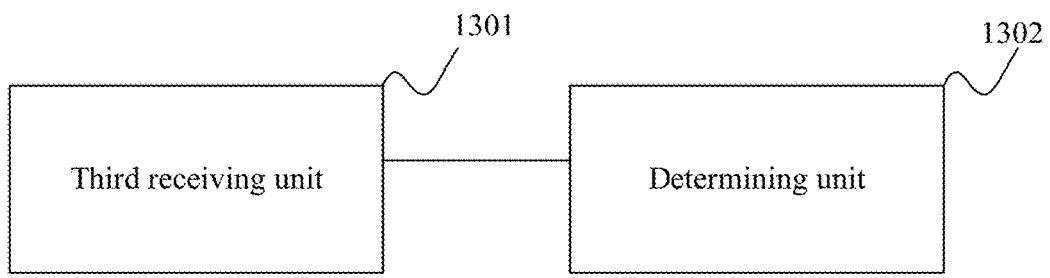
FIG. 16 is a schematic structural diagram of a terminal according to an embodiment of the present disclosure.

Corresponding to the preamble sending method shown in FIG. 15, an embodiment of the present disclosure further provides a terminal, where the terminal may be a terminal device such as a mobile phone or a tablet computer. A schematic structural diagram of the terminal is shown in FIG. 16, and the terminal includes:

a third receiving unit 1301, configured to receive physical layer signaling sent by a network-side device, where the physical layer signaling is used to indicate whether the terminal sends a preamble that includes dedicated physical control channel DPCCH control information; and a determining unit 1302, connected to the third receiving unit 1301 and configured to determine, according to the physical layer signaling, whether to send a preamble that includes dedicated physical control channel DPCCH control information.

The third receiving unit 1301 in the terminal receives the physical layer signaling sent by the network-side device; and the determining unit 1302 determines, according to the physical layer signaling received by the third receiving unit 1301, whether the terminal sends a Preamble that includes DPCCH control information to the network-side device. When there is no information in the physical layer signaling, the terminal does not send a Preamble that includes a DPCCH to the network-side device; and when the physical layer signaling includes Preamble duration information, the terminal sends a Preamble that includes a DPCCH to the network-side device, where the Preamble duration information is Preamble sending duration.

In this embodiment of the present disclosure, another schematic structural diagram of the terminal shown in FIG. 15 is further provided. For the schematic structural diagram of the terminal, reference may also be made to the schematic diagram of the hardware structure shown in FIG. 7. The terminal is the same as the hardware structure shown in FIG. 7 in structural composition of hardware, but different in a function executed by each piece of hardware.

The terminal may also include a CPU and a memory in hardware, where the CPU may execute at least the following steps by running a software program stored in the memory or invoking data stored in the memory:

receive physical layer signaling sent by a network-side device, where the physical layer signaling is used to indicate whether the terminal sends a preamble that includes dedicated physical control channel DPCCH control information; and determine, according to the physical layer signaling, whether to send a preamble that includes dedicated physical control channel DPCCH control information.

For specific details of the foregoing steps, reference may be made to the foregoing records in the specification, and details are not described herein again.

The CPU and the memory may be integrated in a same chip, or may be two independent components.

The program in this embodiment of the present disclosure may specifically include:

a third receiving unit and a determining unit. For detailed structures and functions of the third receiving unit and the determining unit, reference may be made to the foregoing records in the specification, and details are not described herein again.

Figure 17:
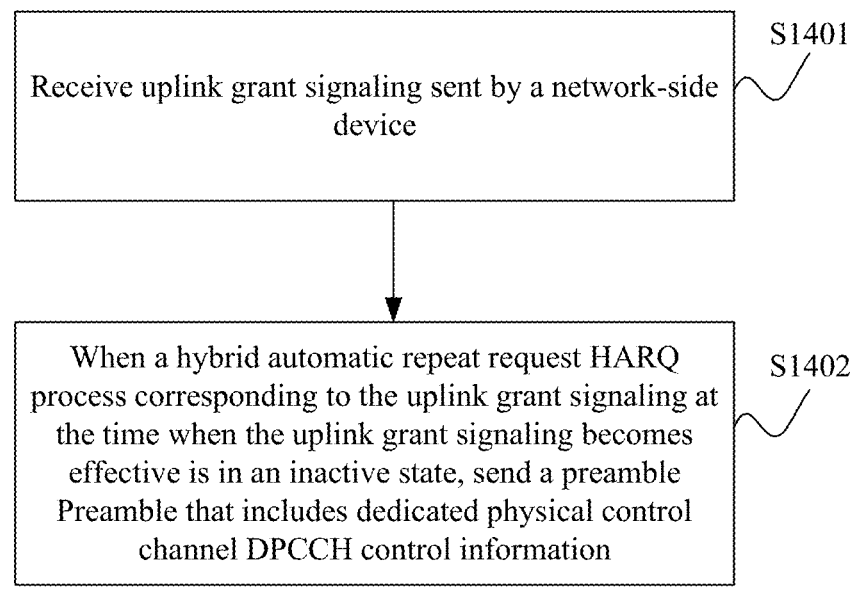
FIG. 17 is a flowchart of a preamble (Preamble) sending method according to an embodiment of the present disclosure.

Referring to FIG. 17, an embodiment of the present disclosure provides a preamble sending method, where the method applies to a terminal, and the terminal may be a terminal device such as a mobile phone or a tablet computer. The method includes:

Step S1401: Receive uplink grant signaling sent by a network-side device.

Step S1402: When a hybrid automatic repeat request HARQ process corresponding to the uplink grant signaling at the time when the uplink grant signaling becomes effective is in an inactive state, send a preamble that includes dedicated physical control channel DPCCH control information.

In the preamble sending method provided in this embodiment of the present disclosure, when receiving the uplink grant signaling sent by the network-side device, when an uplink TTI corresponding to a time when the uplink grant signaling becomes effective is an active HARQ process, the terminal does not send a Preamble that includes a DPCCH to the network-side device; and when an uplink TTI corresponding to a time when the uplink grant signaling becomes effective is an inactive HARQ process, the terminal sends a Preamble that includes a DPCCH to the network-side device. The network-side device may be a base station.

In the preamble sending method provided in this embodiment of the present disclosure, a terminal UE determines, according to uplink grant signaling and an effective HARQ process, whether to send a Preamble, or a Preamble sending time point or Preamble sending duration.

In this embodiment of the present disclosure, it is considered that, not all HARQ processes on a carrier are allocated to a UE supporting a dedicated secondary carrier, that is, a lean UE, for example, HARQ processes 0, 1, 2, and 3 are for scheduling a UE not supporting a dedicated secondary carrier, that is, a legacy UE; and HARQ processes 4, 5, 6, and 7 are for scheduling the UE supporting a dedicated secondary carrier, scheduling of the UE by using the HARQ processes 4, 5, 6, and 7 can be implemented by disabling HARQ processes 0, 1, 2, and 3 of the lean UE.

If a network delivers an E-AGCH to initiate uplink data transmission, and a corresponding time when the E-AGCH becomes effective is HARQ process 4, the lean UE does not need send a Preamble because HARQ process 4 is an effective uplink HARQ process. If a network delivers an E-AGCH to initiate uplink data transmission, and a corresponding time when the E-AGCH becomes effective is HARQ process 0, the lean UE may send a Preamble in uplink processes 0, 1, 2, and 3 to help a base station perform uplink synchronization, path search, and power control because HARQ process 0 is an ineffective uplink HARQ process.

Figure 18:
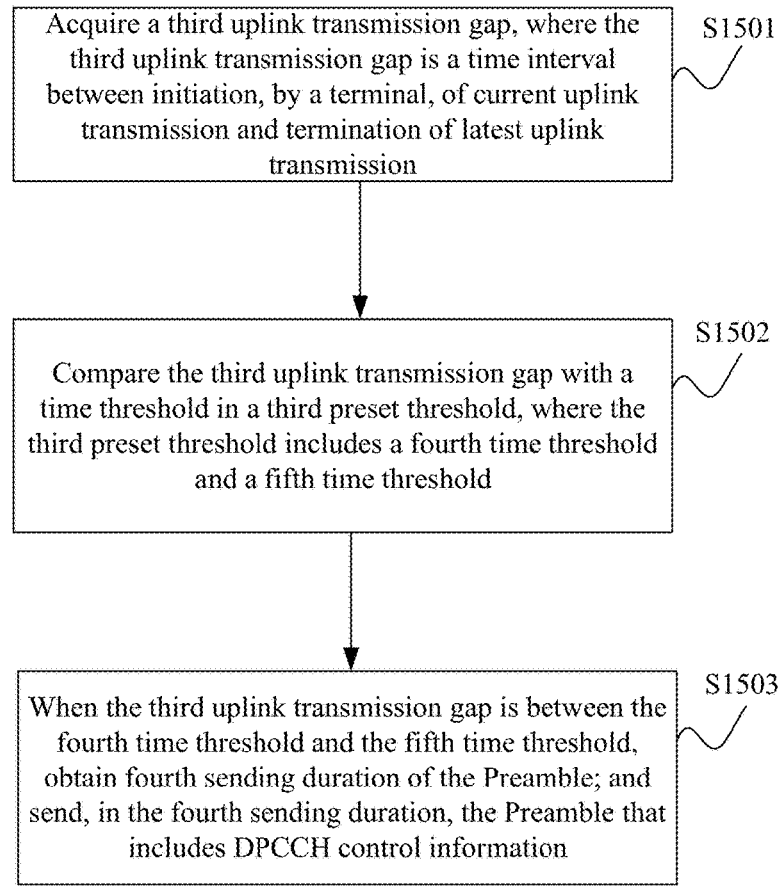
FIG. 18 is a flowchart of a Preamble sending method according to an embodiment of the present disclosure.

Referring to FIG. 18, FIG. 18 shows a process of sending a Preamble that includes a DPCCH in an embodiment of the present disclosure, where the process specifically includes:

Step S1501: Acquire a third uplink transmission gap, where the third uplink transmission gap is a time interval between initiation, by a terminal, of current uplink transmission and termination of most recent uplink transmission.

Step S1502: Compare the third uplink transmission gap with a time threshold in a third preset threshold, where the third preset threshold includes a fourth time threshold and a fifth time threshold.

Step S1503: When the third uplink transmission gap is between the fourth time threshold and the fifth time threshold, obtain fourth sending duration of the Preamble; and send, in the fourth sending duration, the Preamble that includes DPCCH control information.

In the preamble sending method provided in this embodiment of the present disclosure, the third preset threshold further includes a sixth time threshold, and the fourth, the fifth, and the sixth time thresholds are in ascending order.

FIG. 18 shows the process of sending a Preamble that includes DPCCH control information when the third uplink transmission gap is between the fourth time threshold and the fifth time threshold.

In this embodiment of the present disclosure, when the third uplink transmission gap is between the fifth time threshold and the sixth time threshold, the process of sending a Preamble that includes DPCCH control information is similar to the process shown in FIG. 18:

when the third uplink transmission gap is between the fifth time threshold and the sixth threshold, obtain fifth sending duration of the Preamble, where the fifth sending duration is greater than the fourth sending duration; and send, in the fifth sending duration, the Preamble that includes the DPCCH control information; and further, when the third uplink transmission gap is greater than the sixth threshold, obtain sixth sending duration of the Preamble, where the sixth sending duration is greater than the fifth sending duration; and send, in the sixth sending duration, the Preamble that includes the DPCCH control information.

In this embodiment of the present disclosure, a network-side device may also determine, according to an uplink data transmission gap or a data size of a lean UE, whether to send a Preamble, or a Preamble sending time point or Preamble sending duration; and determine, according to the number of HARQ processes supported by the lean UE, an E-AGCH sending time point.

Figure 19:
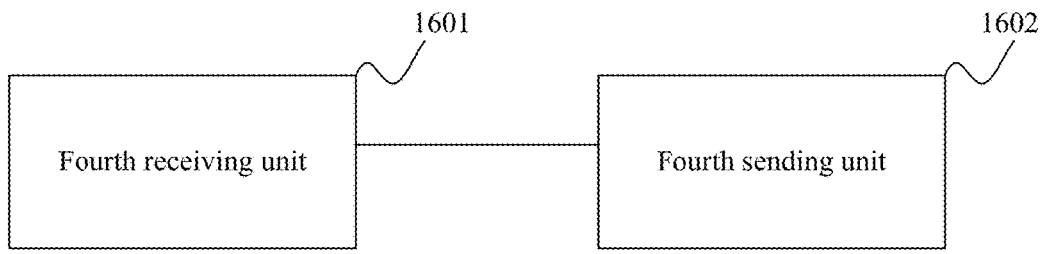
FIG. 19 is a schematic structural diagram of a terminal according to an embodiment of the present disclosure.

Corresponding to the preamble sending method shown in FIG. 17, an embodiment of the present disclosure provides a terminal, where the terminal may be a terminal device such as a mobile phone or a tablet computer. A schematic structural diagram of the terminal is shown in FIG. 19, and the terminal includes:

a fourth receiving unit 1601, configured to receive uplink grant signaling sent by a network-side device; and a fourth sending unit 1602, connected to the fourth receiving unit 1601 and configured to, when a hybrid automatic repeat request HARQ process corresponding to the uplink grant signaling at the time when the uplink grant signaling becomes effective is in an inactive state, send a preamble that includes dedicated physical control channel DPCCH control information.

Figure 20:
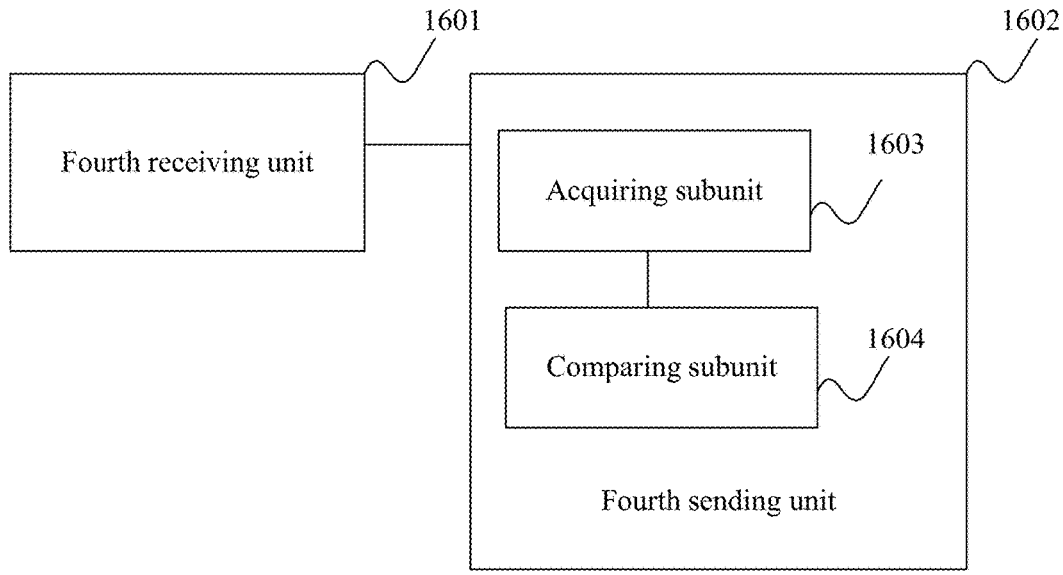
FIG. 20 is a detailed schematic structural diagram of a terminal according to an embodiment of the present disclosure.

Further, referring to FIG. 20, the fourth sending unit 1602 in the terminal includes:

an acquiring subunit 1603, configured to acquire a third uplink transmission gap, where the third uplink transmission gap is a time interval between initiation, by the terminal, of current uplink transmission and termination of most recent uplink transmission; and a comparing subunit 1604, configured to compare the third uplink transmission gap with a time threshold in a third preset threshold.

In the terminal provided in this embodiment of the present disclosure, the acquiring subunit 1603 acquires the third uplink transmission gap, where the third uplink transmission gap is a time interval between initiation, by the terminal, of current uplink transmission and termination of most recent uplink transmission; and the comparing subunit 1604 compares the third uplink transmission gap with a time threshold in the third preset threshold, where the third preset threshold includes a fourth time threshold and a fifth time threshold; when the third uplink transmission gap is between the fourth time threshold and the fifth time threshold, obtains fourth sending duration of the Preamble; and sends, in the fourth sending duration, the Preamble that includes the DPCCH control information.

The third preset threshold further includes a sixth time threshold, where the fourth, the fifth, and the sixth time threshold are in ascending order; and further, when the third uplink transmission gap is between the fifth time threshold and the sixth threshold, fifth sending duration of the Preamble is obtained, where the fifth sending duration is greater than the fourth sending duration; and the Preamble that includes the DPCCH control information is sent in the fifth sending duration;

or, when the third uplink transmission gap is greater than the sixth threshold, sixth sending duration of the Preamble is obtained, where the sixth sending duration is greater than the fifth sending duration; and the Preamble that includes the DPCCH control information is sent in the sixth sending duration.

In this embodiment of the present disclosure, another schematic structural diagram of the terminal shown in FIG. 19 is further provided. For the schematic structural diagram of the terminal, reference may also be made to the schematic diagram of the hardware structure shown in FIG. 7. The terminal is the same as the hardware structure shown in FIG. 7 in structural composition of hardware, but different in a function executed by each piece of hardware.

The terminal may also include a CPU and a memory in hardware, where the CPU may execute at least the following steps by running a software program stored in the memory or invoking data stored in the memory:

receive uplink grant signaling sent by a network-side device; and when a hybrid automatic repeat request HARQ process corresponding to the uplink grant signaling at the time when the uplink grant signaling becomes effective is in an inactive state, send a preamble that includes dedicated physical control channel DPCCH control information.

For specific details of the foregoing steps, reference may be made to the foregoing records in the specification, and details are not described herein again.

The CPU and the memory may be integrated in a same chip, or may be two independent components.

The program in this embodiment of the present disclosure may specifically include:

a fourth receiving unit and a fourth sending unit. For detailed structures and functions of the fourth receiving unit and the fourth sending unit, reference may be made to the foregoing records in the specification, and details are not described herein again.

Figure 21:
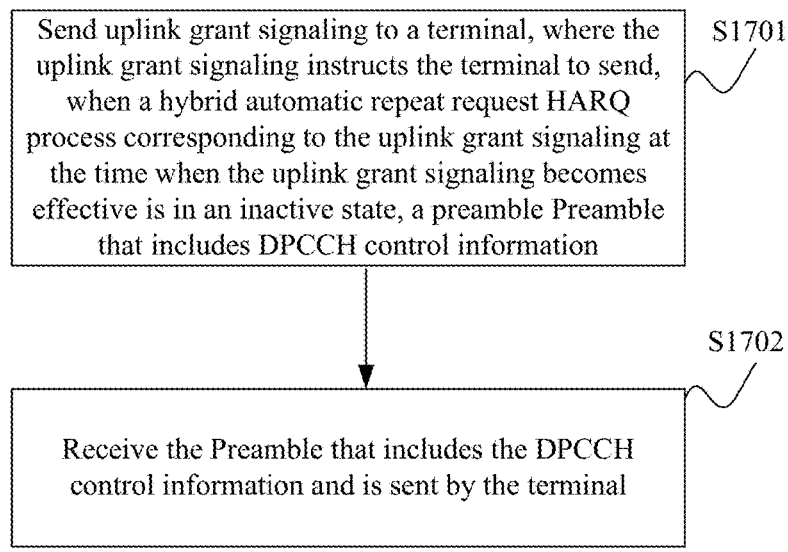
FIG. 21 is a flowchart of a preamble sending method according to an embodiment of the present disclosure.

Referring to FIG. 21, an embodiment of the present disclosure provides a preamble sending method, where the method applies to a network-side device, where the network-side device may be a base station. The method includes:

Step S1701: Send uplink grant signaling to a terminal, where the uplink grant signaling instructs the terminal to send, when a hybrid automatic repeat request HARQ process corresponding to the uplink grant signaling at the time when the uplink grant signaling becomes effective is in an inactive state, a preamble that includes dedicated physical control channel DPCCH control information.

Step S1702: Receive the Preamble that includes the DPCCH control information and is sent by the terminal.

Figure 22:
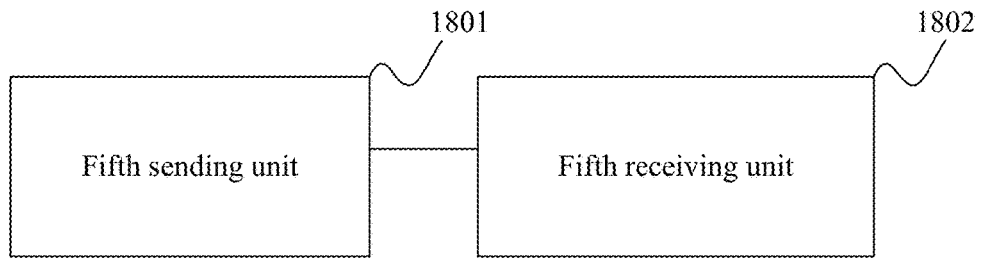
FIG. 22 is a schematic structural diagram of a network-side device according to an embodiment of the present disclosure.

Corresponding to the preamble sending method shown in FIG. 21, FIG. 22 provides a network-side device, where the network-side device may be a base station and include:

a fifth sending unit 1801, configured to send uplink grant signaling to a terminal, where the uplink grant signaling instructs the terminal to send, when a hybrid automatic repeat request HARQ process corresponding to the uplink grant signaling at the time when the uplink grant signaling becomes effective is in an inactive state, a preamble that includes dedicated physical control channel DPCCH control information; and a fifth receiving unit 1802, connected to the fifth sending unit 1801 and configured to receive the Preamble that includes the DPCCH control information and is sent by the terminal.

In this embodiment of the present disclosure, another schematic structural diagram of the terminal shown in FIG. 22 is further provided. For the schematic structural diagram of the terminal, reference may also be made to the schematic diagram of the hardware structure shown in FIG. 7. The terminal is the same as the hardware structure shown in FIG. 7 in structural composition of hardware, but different in a function executed by each piece of hardware.

The terminal may also include a CPU and a memory in hardware, where the CPU may execute at least the following steps by running a software program stored in the memory or invoking data stored in the memory:

send uplink grant signaling to a terminal, where the uplink grant signaling instructs the terminal to send, when a hybrid automatic repeat request HARQ process corresponding to the uplink grant signaling at the time when the uplink grant signaling becomes effective is in an inactive state, a preamble that includes dedicated physical control channel DPCCH control information; and receive the Preamble that includes the DPCCH control information and is sent by the terminal.

For specific details of the foregoing steps, reference may be made to the foregoing records in the specification, and details are not described herein again.

The CPU and the memory may be integrated in a same chip, or may be two independent components.

The program in this embodiment of the present disclosure may specifically include:

a fifth sending unit and a fifth receiving unit. For detailed structures and functions of the fifth sending unit and the fifth receiving unit, reference may be made to the foregoing records in the specification, and details are not described herein again.

It may be clearly understood by persons skilled in the art that, for ease and brevity of description, for a detailed working process of the foregoing devices and modules, reference may be made to a corresponding process description in the foregoing method embodiments, and details are not described herein again.

Figure 23:
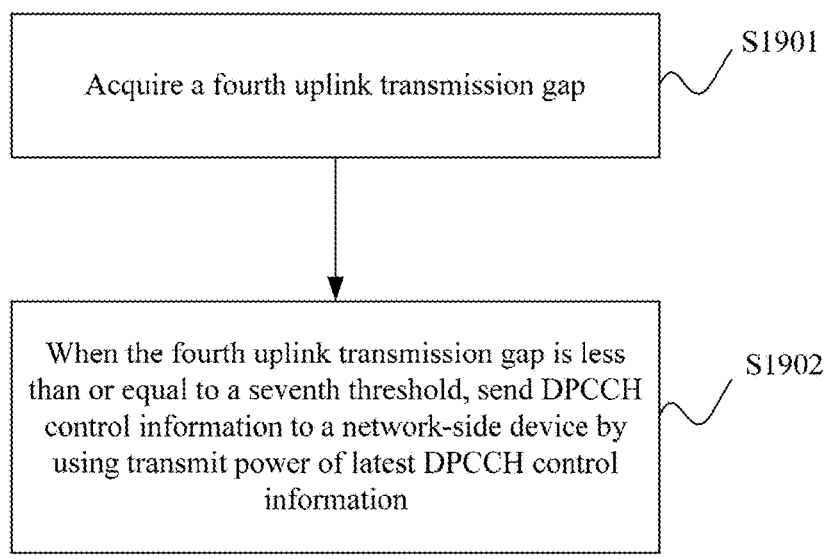
FIG. 23 is a flowchart of a method for sending DPCCH control information according to an embodiment of the present disclosure.

Referring to FIG. 23, FIG. 23 shows a method for sending dedicated physical control channel DPCCH control information according to an embodiment of the present disclosure, where the method applies to a terminal, and an execution body of the method may be a terminal device such as a mobile phone or a tablet computer. The method includes:

Step S1901: Acquire a fourth uplink transmission gap, where the fourth uplink transmission gap is a time interval between initiation, by a terminal, of current uplink transmission and termination of most recent uplink transmission, or a time interval between reception, by a terminal, of current uplink scheduling and reception of most recent uplink scheduling.

When receiving uplink grant signaling sent by a network-side device, the terminal acquires the fourth uplink transmission gap according to the received uplink grant signaling, where the fourth uplink transmission gap is a time interval between initiation, by the terminal, of current uplink transmission and termination of most recent uplink transmission, or a time interval between reception, by the terminal, of current uplink scheduling and reception of most recent uplink scheduling.

Step S1902: When the fourth uplink transmission gap is less than or equal to a seventh threshold, send DPCCH control information to a network-side device by using transmit power of most recent DPCCH control information, where the seventh threshold is predefined by a network and the terminal or delivered to the terminal by the network-side device.

In this embodiment of the present disclosure, the network-side device may be a base station or a radio network controller RNC, and the network-side device sends the uplink grant signaling to the terminal, where the uplink grant signaling is used to indicate a time when the terminal initiates uplink transmission.

The acquired fourth uplink transmission gap is compared with the seventh threshold; and when the fourth uplink transmission gap is less than or equal to the seventh threshold, the terminal sends the DPCCH control information to the network-side device by using the transmit power of the most recent DPCCH control information.

The seventh threshold may be preset by the terminal, or may be preset by a network set and sent to the terminal.

In this embodiment of the present disclosure, in a case in which a terminal does not perform uplink transmission or does not send a DPCCH to a network-side device for a long time, when the network-side device delivers uplink grant signaling to the terminal to instruct the terminal to perform uplink transmission, by using the method for sending DPCCH control information provided in the present disclosure, power for sending a DPCCH by the terminal is DPCCH power in most recent uplink transmission. Because a channel attenuation change in uplink transmission is affected by a transmission gap, that is, a channel attenuation change becomes more obvious as the transmission gap becomes larger. When the transmission gap is small, the channel attenuation change is not obvious; therefore, good initial power control of a DPCCH can be achieved by using a previous DPCCH, so that receive power of the DPCCH or a received signal-to-interference ratio SIR stays at a level close to a target value. When the transmission gap is large, the channel attenuation change is obvious; therefore, using a previous DPCCH may cause an obvious power control error, and leads to an obvious difference between receive power of the DPCCH or a received SIR and a target value. A UE may use a new method for setting DPCCH power, for example, use average DPCCH power or power after filtering, or introduce a power headroom or an offset on a basis of previous DPCCH power, average DPCCH power, or power after DPCCH filtering, so as to reduce a variance of DPCCH power control by using long-term statistics collection and a power headroom, and ensure DPCCH power control performance.

Figure 24:
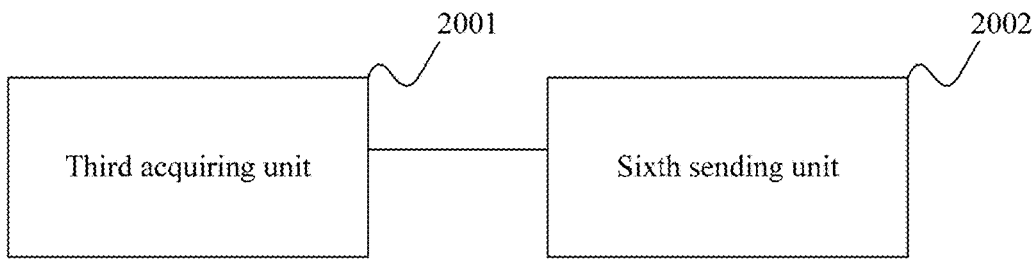
FIG. 24 is a schematic structural diagram of a terminal according to an embodiment of the present disclosure.

Corresponding to the method shown in FIG. 23, an embodiment of the present disclosure provides a terminal, where a schematic structural diagram of the terminal is shown in FIG. 24, and the terminal includes:

a third acquiring unit 2001, configured to acquire a fourth uplink transmission gap, where the fourth uplink transmission gap is a time interval between initiation, by the terminal, of current uplink transmission and termination of most recent uplink transmission, or a time interval between reception, by the terminal, of current uplink scheduling and reception of most recent uplink scheduling; and a sixth sending unit 2002, connected to the third acquiring unit and configured to, when the fourth uplink transmission gap is less than or equal to a seventh threshold, send DPCCH control information to a network-side device by using transmit power of most recent DPCCH control information, where the seventh threshold is predefined by a network and the terminal or delivered to the terminal by the network-side device.

In this embodiment of the present disclosure, another schematic structural diagram of the terminal shown in FIG. 24 is further provided. For the schematic structural diagram of the terminal, reference may also be made to the schematic diagram of the hardware structure shown in FIG. 7. The terminal is the same as the hardware structure shown in FIG. 7 in structural composition of hardware, but different in a function executed by each piece of hardware.

The terminal may also include a CPU and a memory in hardware, where the CPU may execute at least the following steps by running a software program stored in the memory or invoking data stored in the memory:

acquire a fourth uplink transmission gap, where the fourth uplink transmission gap is a time interval between initiation, by the terminal, of current uplink transmission and termination of most recent uplink transmission, or a time interval between reception, by the terminal, of current uplink scheduling and reception of most recent uplink scheduling; and when the fourth uplink transmission gap is less than or equal to a seventh threshold, send DPCCH control information to a network-side device by using transmit power of most recent DPCCH control information, where the seventh threshold is predefined by a network and the terminal or delivered to the terminal by the network-side device.

For specific details of the foregoing steps, reference may be made to the foregoing records in the specification, and details are not described herein again.

The CPU and the memory may be integrated in a same chip, or may be two independent components.

The program in this embodiment of the present disclosure may specifically include:

a third acquiring unit and a sixth sending unit. For detailed structures and functions of the third acquiring unit and the sixth sending unit, reference may be made to the foregoing records in the specification, and details are not described herein again.

Figure 25:
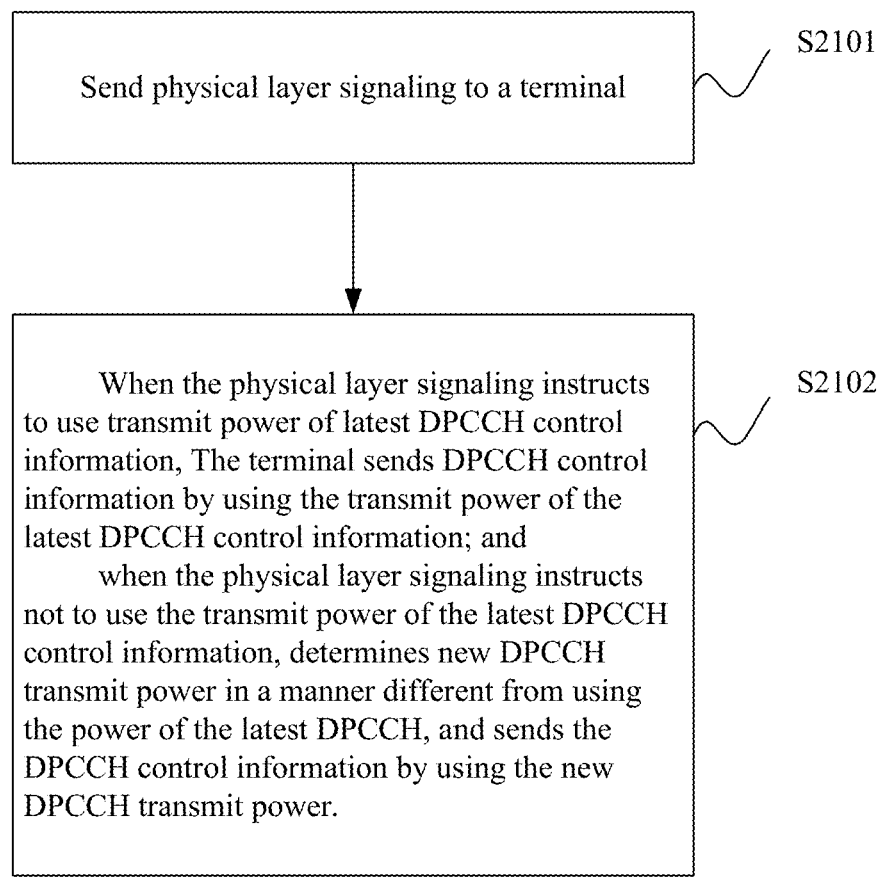
FIG. 25 is a flowchart of a method for sending DPCCH control information according to an embodiment of the present disclosure.

Referring to FIG. 25, FIG. 25 shows a method for sending dedicated physical control channel DPCCH control information according to an embodiment of the present disclosure, where an execution body of the method may be a terminal. The method includes:

Step S2101: Receive physical layer signaling sent by a network side, and determine transmit power of the DPCCH control information according to the physical layer signaling.

Step S2102: When the physical layer signaling instructs to use transmit power of most recent DPCCH control information, the terminal sends the DPCCH control information by using the transmit power of the most recent DPCCH control information; and when the physical layer signaling instructs not to use the transmit power of the most recent DPCCH control information, determines new DPCCH transmit power in a manner different from using power of the most recent DPCCH, and sends the DPCCH control information by using the new DPCCH transmit power.

In this embodiment of the present disclosure, in a process of determining the transmit power of the DPCCH control information, at least one manner of the two determining manners in step S2102 is included.

In this embodiment of the present disclosure, when the physical layer signaling instructs not to use the transmit power of the most recent DPCCH control information, DPCCH power is determined by a terminal in a manner different from using power of the most recent DPCCH.

The physical layer signaling is an HS-SCCH order, or an encoding manner of the physical layer signaling is the same as that of an enhanced dedicated channel E-DCH absolute grant channel E-AGCH.

In this embodiment of the present disclosure, when a terminal receives uplink grant signaling sent by a network side device, the network-side device correspondingly provides a method for setting DPCCH power, that is, whether previous power is used for a DPCCH. In this implementation manner, the network side may indicate, by using signaling according to a change of an uplink channel and a change of an interference level, whether to use the previous DPCCH power. When a combined effect caused by the change of the uplink channel and the change of the interference level is similar to that of previous uplink transmission, the network side may instruct a UE to use the previous DPCCH power; and when the combined effect caused by the change of the uplink channel and the change of the interference level obviously changes in comparison to the previous uplink transmission, the network-side device may instruct the terminal to determine DPCCH power in a manner different from using power of most recent DPCCH, for example, instruct the UE to use a new method for setting DPCCH power, such as, using average DPCCH power, or power after filtering, or introducing a power headroom or an offset on a basis of the previous DPCCH power, average DPCCH power, or power after DPCCH filtering, so as to reduce a variance of DPCCH power control by using long-term statistics collection and a power headroom, and ensure DPCCH power control performance. Typically, the network side may use an HS-SCCH order to indicate a method for setting power, for example, use one HS-SCCH order to instruct the UE not to use the power of the most recent DPCCH, and/or use one HS-SCCH order to instruct the UE to use the power of the most recent DPCCH. A feasible implementation manner is that a network does not send any physical layer signaling. In this case, the network and the terminal agree on whether to use the power of the most recent DPCCH or not to use the power of the most recent DPCCH. The network side may also use a Scope bit in an E-AGCH, or one bit in an E-AGCH, or a channel with an encoding manner same as that of an E-AGCH to carry signaling that indicates a method for setting DPCCH power.

Figure 26:
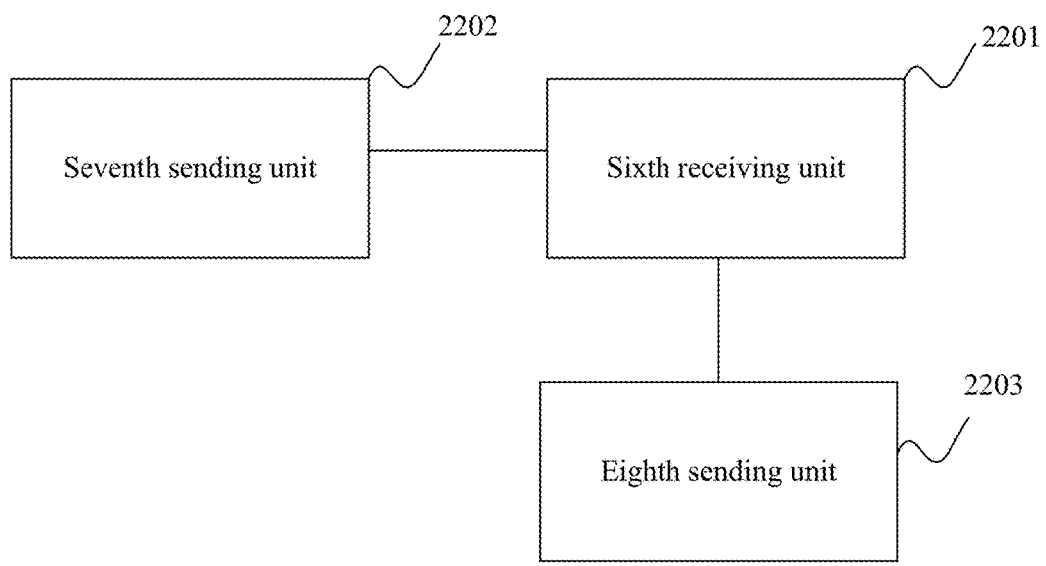
FIG. 26 is a schematic structural diagram of a terminal according to an embodiment of the present disclosure.

Corresponding to the method shown in FIG. 25, an embodiment of the present disclosure provides a terminal, where a schematic structural diagram of the terminal is shown in FIG. 26, and the terminal includes:

a sixth receiving unit 2201, configured to receive physical layer signaling sent by a network side, and determine, according to the physical layer signaling, transmit power of DPCCH control information;

a seventh sending unit 2202, connected to the sixth receiving unit and configured to, when the physical layer signaling instructs to use transmit power of most recent DPCCH control information, send, by the terminal, the DPCCH control information by using the transmit power of the most recent DPCCH control information; and an eighth sending unit 2203, connected to the sixth receiving unit and configured to, when the physical layer signaling instructs not to use the transmit power of the most recent DPCCH control information, determine new DPCCH transmit power in a manner different from using power of the most recent DPCCH, and send the DPCCH control information by using the new DPCCH transmit power.

In this embodiment of the present disclosure, another schematic structural diagram of the terminal shown in FIG. 26 is further provided. For the schematic structural diagram of the terminal, reference may also be made to the schematic diagram of the hardware structure shown in FIG. 7. The terminal is the same as the hardware structure shown in FIG. 7 in structural composition of hardware, but different in a function executed by each piece of hardware.

The terminal may also include a CPU and a memory in hardware, where the CPU may execute at least the following step by running a software program stored in the memory or invoking data stored in the memory:

receive physical layer signaling sent by a network side, and determine, according to the physical layer signaling, transmit power of DPCCH control information; where the determining method includes at least one manner of the following manners:

when the physical layer signaling instructs to use transmit power of most recent DPCCH control information, sending, by the terminal, the DPCCH control information by using the transmit power of the most recent DPCCH control information; and when the physical layer signaling instructs not to use the transmit power of the most recent DPCCH control information, determining new DPCCH transmit power in a manner different from using power of the most recent DPCCH, and sending the DPCCH control information by using the new DPCCH transmit power.

When the physical layer signaling instructs not to use the transmit power of the most recent DPCCH control information, the terminal determines DPCCH power in a manner different from using power of the most recent DPCCH. The terminal determines DPCCH power in a manner different from using power of the most recent DPCCH, for example, uses average DPCCH power, or power after filtering, or introduces a power headroom or an offset on a basis of previous DPCCH power, average DPCCH power, or power after DPCCH filtering, so as to reduce a variance of DPCCH power control by using long-term statistics collection and a power headroom, and ensure DPCCH power control performance. For specific details of the foregoing steps, reference may be made to the foregoing records in the specification, and details are not described herein again.

The CPU and the memory may be integrated in a same chip, or may be two independent components.

The program in this embodiment of the present disclosure may specifically include:

a seventh sending unit, a sixth receiving unit, and an eighth sending unit. For detailed structures and functions of the seventh sending unit, the sixth receiving unit, and the eighth sending unit, reference may be made to the foregoing records in the specification, and details are not described herein again.

Person of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

In the several embodiments provided in the present application, it should be understood that the disclosed device and method may be implemented in other manners. For example, the described apparatus embodiment is merely exemplary. For example, the module division is merely logical function division and may be other division in actual implementation. For example, a plurality of modules or components may be combined or integrated into another device, or some features may be ignored or not performed. In addition, the displayed or discussed mutual couplings or direct couplings or communication connections may be implemented through some communication interfaces. The indirect couplings or communication connections between the apparatuses or modules may be implemented in electronic, mechanical, or other forms.

The modules described as separate parts may or may not be physically separate, and parts displayed as modules may or may not be physical units, may be located in one position, or may be distributed on a plurality of network units. A part or all of the modules may be selected according to actual needs to achieve the objectives of the solutions of the embodiments.

In addition, functional modules in the embodiments of the present disclosure may be integrated into one processing module, or each of the modules may exist alone physically, or two or more modules are integrated into one module.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A method for sending a dedicated physical control channel (DPCCH), comprising:
   acquiring, by a terminal, an uplink transmission gap, wherein the uplink transmission gap is a time interval between an initiation, by the terminal, of a current uplink transmission and a termination of a most recent uplink transmission; and
   determining, by the terminal, whether the uplink transmission gap is less than or equal to a threshold,
   wherein in response to determining that the uplink transmission gap is less than or equal to the threshold, sending, by the terminal, a DPCCH to a network-side device by using transmit power of a most recent DPCCH, and
   wherein in response to determining that the uplink transmission gap is larger than the threshold, sending, by the terminal, a DPCCH to the network-side device by using transmit power that is obtained by introducing an offset based on a power of the most recent DPCCH.

2. The method according to claim 1, wherein the threshold is received by the terminal from the network-side device.

3. The method according to claim 1, wherein the threshold is preset by the terminal.

4. A terminal, comprising:
   a processor, configured to acquire an uplink transmission gap, wherein the uplink transmission gap is a time interval between an initiation, by the terminal, of a current uplink transmission and a termination of a most recent uplink transmission, and determine whether the uplink transmission gap is less than or equal to a threshold; and
   a transmitter, configured to, in response to the uplink transmission gap being less than or equal to a threshold, send a dedicated physical control channel (DPCCH) to a network-side device by using transmit power of a most recent DPCCH, and, in response to the uplink transmission gap being larger than the threshold, send a DPCCH to the network-side device by using transmit power that is obtained by introducing an offset based on a power of the most recent DPCCH.

5. The terminal according to claim 4, further comprising:
   a receiver configured to receive the threshold from the network-side device.

6. The terminal according to claim 4, wherein the threshold is preset by the terminal.

7. A non-transitory computer-readable medium on which a program is stored, wherein the program, when executed by a processor, enables a terminal to perform the steps of:
   acquiring an uplink transmission gap, wherein the uplink transmission gap is a time interval between an initiation, by the terminal, of a current uplink transmission and a termination of a most recent uplink transmission; and
   determining whether the uplink transmission gap is less than or equal to a threshold,
   wherein in response to determining that the uplink transmission gap is less than or equal to the threshold, sending a DPCCH to a network-side device by using transmit power of a most recent DPCCH, and
   wherein in response to determining that the uplink transmission gap is larger than the threshold, sending a DPCCH to the network-side device by using transmit power that is obtained by introducing an offset based on a power of the most recent DPCCH.

8. The computer-readable medium according to claim 7, wherein the steps further comprise:
   receiving the threshold from the network-side device.

9. The computer-readable medium according to claim 7, wherein the threshold is preset by the terminal.

* * * * *